US009963001B2

(12) United States Patent
Salter et al.

(10) Patent No.: US 9,963,001 B2
(45) Date of Patent: May 8, 2018

(54) VEHICLE WHEEL ILLUMINATION ASSEMBLY USING PHOTOLUMINESCENT MATERIAL

(71) Applicant: Ford Global Technologies, LLC, Dearborn, MA (US)

(72) Inventors: Stuart C. Salter, White Lake, MI (US); James J. Surman, Clinton Township, MI (US); Paul Kenneth Dellock, Northville, MI (US); Cornel Lewis Gardner, Romulus, MI (US); Ali Ammar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/079,622

(22) Filed: Mar. 24, 2016

(65) Prior Publication Data

US 2017/0274712 A1    Sep. 28, 2017

(51) Int. Cl.
| | |
|---|---|
| *B60Q 1/26* | (2006.01) |
| *B60C 23/04* | (2006.01) |
| *F21K 9/64* | (2016.01) |
| *B60Q 1/32* | (2006.01) |
| *B60Q 1/50* | (2006.01) |
| *G08B 5/36* | (2006.01) |

(52) U.S. Cl.
CPC .......... *B60C 23/0405* (2013.01); *B60Q 1/32* (2013.01); *B60Q 1/326* (2013.01); *B60Q 1/50* (2013.01); *F21K 9/64* (2016.08); *B60Q 1/2607* (2013.01); *B60Q 2900/30* (2013.01); *F21S 43/14* (2018.01); *G08B 5/36* (2013.01)

(58) Field of Classification Search
CPC ......... B60C 23/0405; F21K 9/64; G08B 5/36; B60Q 1/32; B60Q 1/50; B60Q 1/2607; B60Q 1/326; B60Q 2900/30; F21S 43/14
USPC ........................................................ 340/469
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,414,947 A * | 5/1995 | Hjaltason | G09F 13/04 40/584 |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Zhen Y Wu
(74) *Attorney, Agent, or Firm* — Jason Rogers; Price Heneveld LLP

(57) ABSTRACT

A vehicle wheel illumination assembly includes a light source located on the body of a vehicle near the wheel well and oriented to direct light onto a wheel assembly having a tire. A tire pressure indicator detects tire pressure of the tire. The light source illuminates the wheel assembly with a desired color to indicate a tire pressure status based on the detected tire pressure. A photoluminescent material is located on the wheel assembly and configured to luminesce in response to excitation by the light assembly.

19 Claims, 18 Drawing Sheets

(56) References Cited

U.S. PATENT DOCUMENTS

| | | | |
|---|---|---|---|
| 6,294,989 B1 * | 9/2001 | Schofield | B60C 23/00 340/438 |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,641,041 B2 | 11/2003 | Olds et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ickikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,187,034 B2 | 11/2015 | Tarahomi et al. | |
| 9,210,771 B2 * | 12/2015 | Day | B60Q 1/2615 |
| 9,299,887 B2 | 3/2016 | Lowenthal et al. | |
| 9,315,148 B2 | 4/2016 | Schwenke et al. | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 * | 11/2002 | Formoso | B60Q 1/326 362/34 |
| 2003/0167668 A1 | 9/2003 | Fuks et al. | |
| 2003/0179548 A1 | 9/2003 | Becker et al. | |
| 2004/0084120 A1 * | 5/2004 | Arnold | B29D 30/54 152/151 |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2006/0158893 A1 * | 7/2006 | Wilkerson, III | B60Q 1/2657 362/500 |
| 2006/0196089 A1 * | 9/2006 | Guzman | A43B 1/0036 36/137 |
| 2007/0032319 A1 | 2/2007 | Tufte | |
| 2007/0206389 A1 * | 9/2007 | Salazar | B60Q 1/0035 362/540 |
| 2007/0285938 A1 * | 12/2007 | Palmer | B60B 1/003 362/500 |
| 2007/0297045 A1 | 12/2007 | Sakai et al. | |
| 2008/0105345 A1 * | 5/2008 | Fenkanyn | B60C 13/001 152/152.1 |
| 2008/0133081 A1 * | 6/2008 | Colarelli | B60C 23/0408 701/29.2 |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2012/0001406 A1 | 1/2012 | Paxton et al. | |
| 2012/0009395 A1 * | 1/2012 | Dain | B41M 5/00 428/195.1 |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0015637 A1 * | 1/2014 | Dassanayake | G07C 9/00174 340/5.54 |
| 2014/0027035 A1 * | 1/2014 | Joza | B60C 13/02 152/523 |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2014/0375007 A1 * | 12/2014 | Fissell | F21S 10/02 280/87.042 |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0231936 A1 * | 8/2015 | Keller | B60C 23/0406 340/442 |
| 2015/0267881 A1 | 9/2015 | Salter et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2017/0158125 A1 | 6/2017 | Schuett et al. | |

(56) References Cited

U.S. PATENT DOCUMENTS

FOREIGN PATENT DOCUMENTS

| | | | |
|---|---|---|---|
| CN | 201193011 | Y | 2/2009 |
| CN | 204127823 | U | 1/2015 |
| CN | 104669950 | A | 6/2015 |
| DE | 4120677 | A1 | 1/1992 |
| DE | 29708699 | U1 | 7/1997 |
| DE | 10319396 | A1 | 11/2004 |
| EP | 1793261 | A1 | 6/2007 |
| EP | 2778209 | A1 | 9/2014 |
| JP | 2000159011 | A | 6/2000 |
| JP | 2007238063 | A | 9/2007 |
| KR | 20060026531 | A | 3/2006 |
| WO | 2006047306 | A1 | 5/2006 |
| WO | 2014068440 | A1 | 5/2014 |
| WO | 2014161927 | A1 | 10/2014 |

\* cited by examiner

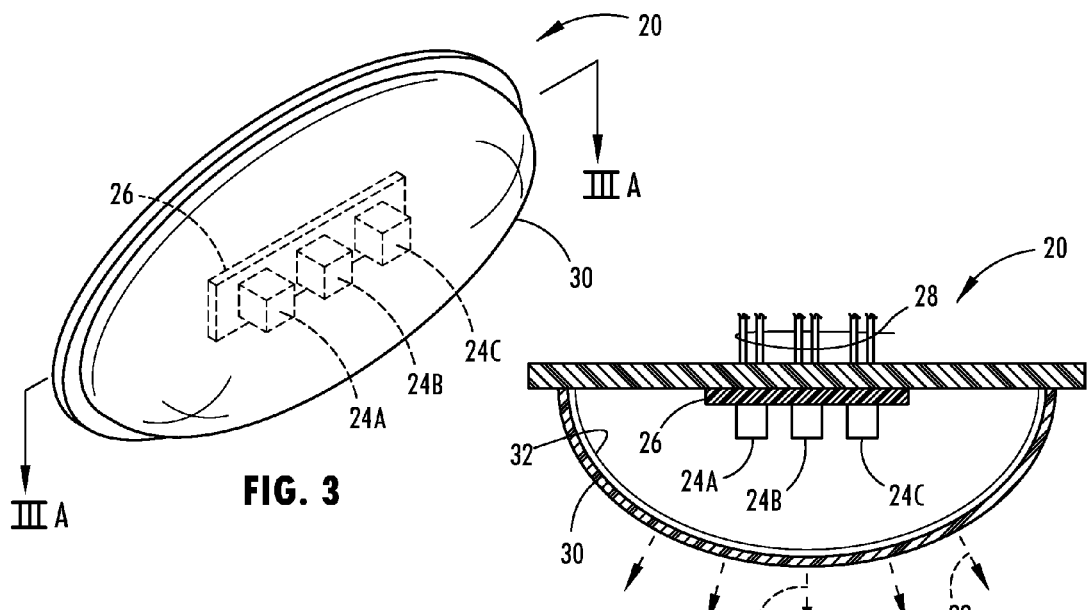
FIG. 3
FIG. 3A
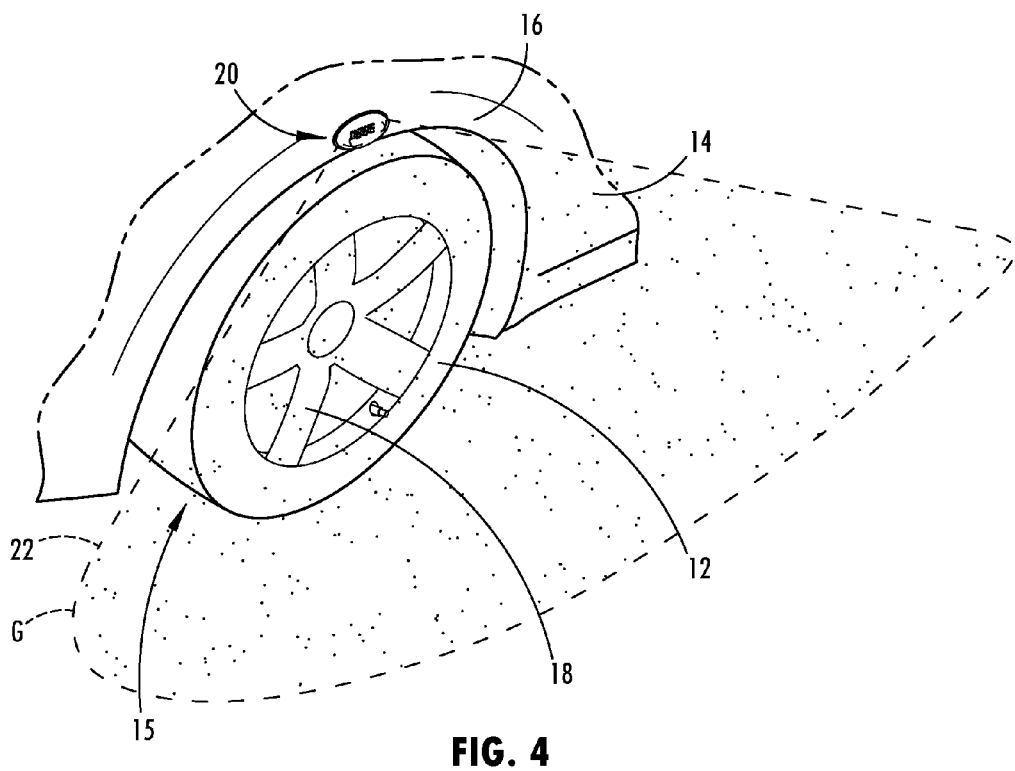
FIG. 4

VEHICLE WHEEL ILLUMINATION ASSEMBLY USING PHOTOLUMINESCENT MATERIAL

FIELD OF THE INVENTION

The present invention generally relates to vehicle exterior lighting, and more particularly relates to a body-mounted lamp for illuminating the tire on a vehicle.

BACKGROUND OF THE INVENTION

Automotive wheeled vehicles employ wheels having inflated tires that are designed to operate efficiently within a certain tire air pressure range. Some vehicles are equipped with tire pressure monitors for monitoring the tire air pressure and provide an indicator such as a warning on a display in the instrument cluster when the tire pressure is low while the vehicle is operating. It is desirable to provide for a tire pressure indicator to indicate the status of the tire that is readily discernible by a vehicle operator, such as when the vehicle is not operating. It is further desirable to provide for efficient and effective illumination of the wheel during the servicing of a tire.

SUMMARY OF THE INVENTION

According to one aspect of the present invention, a vehicle wheel illumination assembly is provided. The assembly includes a light source located on a vehicle body and arranged to illuminate a wheel assembly having a tire and a photoluminescent material located on the wheel assembly and configured to luminesce in response to excitation by the light assembly.

According to another aspect of the present invention, a vehicle wheel illumination assembly is provided. The assembly includes a light source located on a body of a vehicle, and a tire pressure detector for detecting air inflation pressure of a tire on a wheel assembly of the vehicle. The assembly also includes a photoluminescent material located on the wheel assembly configured to luminesce in response to excitation by the light source, and a controller controlling the light source to illuminate the wheel assembly with a first color light indicative of a tire air pressure status.

According to a further aspect of the present invention, a method of illuminating a vehicle wheel assembly. The method includes the steps of arranging a light source on a vehicle body to illuminate a wheel assembly comprising a tire, providing a photoluminescent material on the wheel assembly, and activating a light source to illuminate light on the wheel assembly and excite the photoluminescent material to luminesce.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a an enlarged perspective view of the lamp assembly employing three LEDs, according to one embodiment;

FIG. 3A is a cross-sectional view of the lamp assembly taken through line IIIA-IIIA of FIG. 3;

FIG. 4 is an enlarged perspective view of a portion of the vehicle body illustrating one of the wheel wells and lamp assembly for illuminating the wheel assembly for a fully inflated tire;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
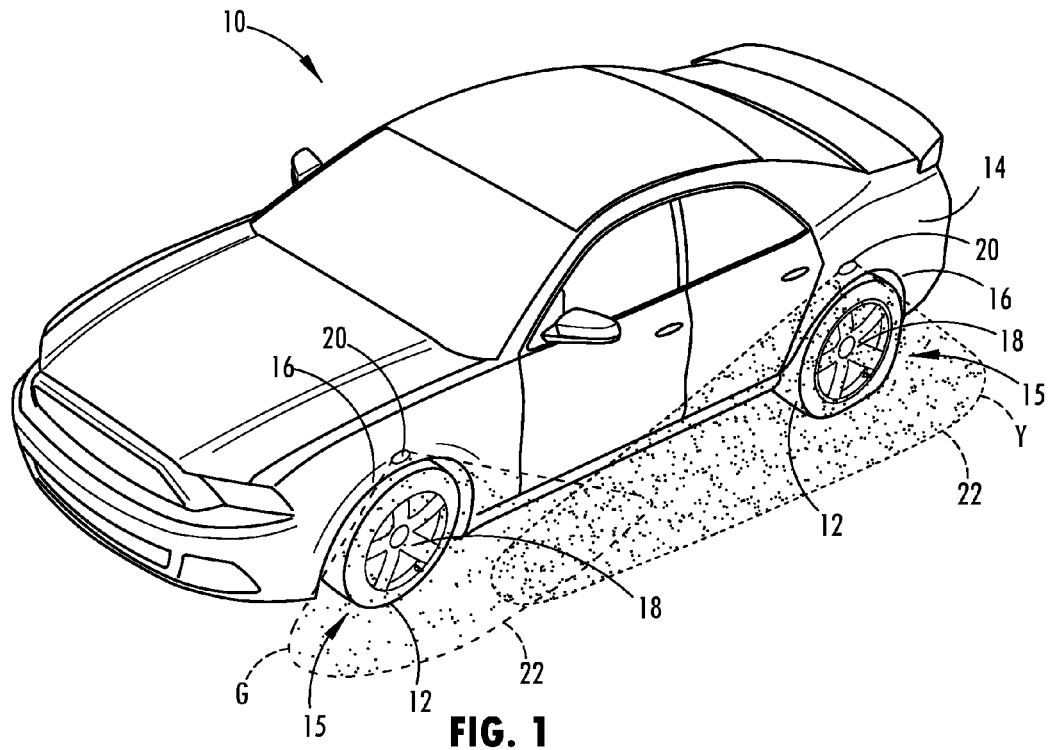
FIG. 1 is a side perspective view of an automotive vehicle having lamp assemblies located near each wheel well for illuminating the corresponding wheel assemblies, according to one embodiment.
Figure 2:
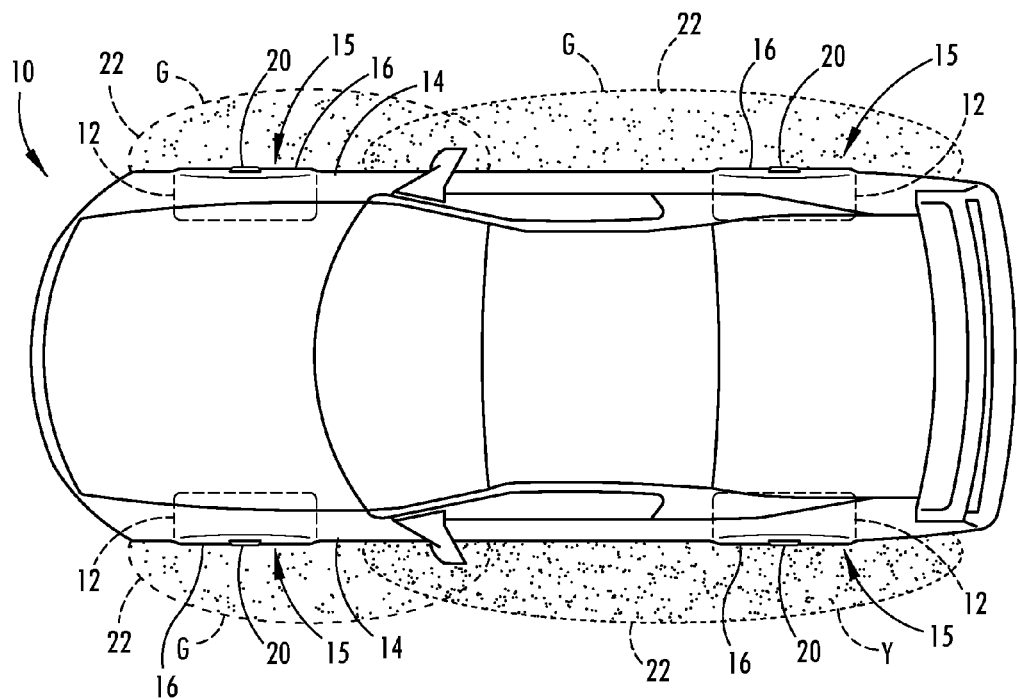
FIG. 2 is a top view of an automotive vehicle having the lamp assemblies shown in FIG. 1.
Figure 9:
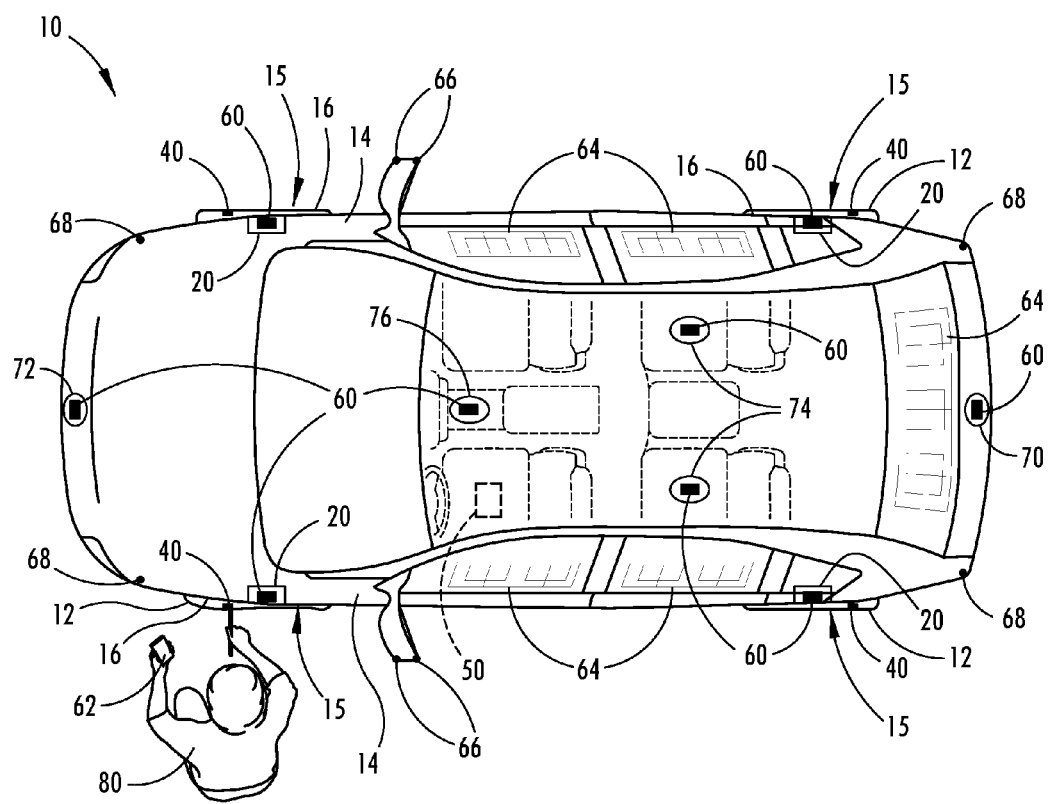
FIG. 9 is a top view of a vehicle having a sensing arrangement using various sensors to detect a person near a wheel assembly and controlling the light source to enable servicing of the tire, according to another embodiment.

For purposes of description herein, the terms "upper," "lower," "right," "left," "rear," "front," "vertical," "horizontal," and derivatives thereof shall relate to the invention as oriented in FIGS. 1, 2 and 9. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, an automotive wheeled vehicle 10 is shown in a form of a passenger car having a body 14 and four wheel assemblies 15 having central wheels 18 and rubber tires 12 assembled thereto. The vehicle 10 may include any wheeled vehicle, such as a car, a truck, or a bus having tires that are inflated with pressurized air and in contact with the roadway. Each tire 12 is assembled to the corresponding wheel 18 and is inflated with air preferably at a desired inflation pressure to provide adequate vehicle performance. Tires are typically inflated with pressurized air to a pressure within a desired range as suggested by the tire manufacturer. When the tire pressure drops below a low tire pressure limit, the tire may be considered a flat tire.

The vehicle 10 is equipped with a vehicle wheel illumination assembly 20 located near each wheel well 16 on the vehicle body 14 to illuminate a corresponding a wheel assembly 15 including the tire 12 to indicate the tire pressure status. In the example shown, four wheel illumination assemblies 20 are provided to illuminate the four wheel assemblies including the four tires 12, respectively. Each wheel illumination assembly 20 includes a light source located near the wheel well 16 of the vehicle body 14. The wheel illumination assembly 20 is shown located on the upper outer edge of the wheel well 16 and arranged to generate light illumination downward and laterally outward so as to illuminate the outer wall of the corresponding tire 12 and the outer surface of the wheel 18 as well as the ground surface extending laterally outward therefrom. The illumination assembly 20 has a predetermined light color indicative of the status of the tire. According to one embodiment, the light source of the illumination assembly 20 illuminates the tire with a first color light to indicate a low tire pressure when the tire pressure is below a low pressure limit and illuminates the tire with a different second color light to indicate sufficient tire pressure when the tire pressure is above the low pressure limit. For example, a low tire pressure status may be indicated with the use of a first yellow color light and a second green color light may be employed to indicate sufficient tire pressure status.

In addition to providing lighting for tire inflation indication, the wheel illumination assembly 20 may further illuminate the tires 12, wheels 18 and nearby ground surface with light when a puddle lamp signal is generated to provide puddle lamp lighting. For example, when an operator (person) approaching the vehicle 10 initiates a door unlock activation via an input on a key fob or other device, the four wheel illumination assemblies 20 may all be activated to provide puddle lamp lighting. The puddle lamp lighting provided by wheel illumination assemblies 20 may be in addition to other lighting provided by puddle lamps otherwise provided on the vehicle 10, such as on the rearview exterior mirror assembly, or may replace such puddle lamp assemblies. Further, the wheel illumination assembly 20 may illuminate one or more tires 12, wheels 18 and ground surface when the vehicle 10 is driven and a turn signal is generated to provide a turn signal indication. As such, the light source of the illumination assembly 20 may flash a red, amber or other color light as a turn signal indication in addition to or in place of other vehicle turn signal indicators.

The wheel illumination assembly 20 is further illustrated in FIGS. 3 and 3A, according to one embodiment. In this embodiment, the wheel illumination assembly 20 includes a plurality of light emitting diodes (LEDs), such as three LEDs 24A-24C, all shown mounted to a circuit board 26. Each of LEDs 24A-24C includes electrical circuitry 28 for receiving electrical power to generate light illumination at a desired wavelength or frequency. In one embodiment, each of LEDs 24A-24C generates a light output at a different wavelength, such as 460 nanometer (nm), 470 nm, and 480 nm, respectively. An outer lens with optics 30 is provided to direct the light generated by the light source downward into a desired light projection field to illuminate the outer walls of the wheel assembly including the tire 12 and wheel 18 and the ground surface extending laterally outward from the corresponding tire 12. In addition, the wheel illumination assembly 20 has an inner lens 32 shown located between the outer lens 30 and the LEDs 24A-24C.

The inner lens 32 may be made of plastic and may include different rylene dye impregnations provided in or on plastic lens 32. A first rylene dye when illuminated with 460 nm wavelength light of the first LED emits a red light at a wavelength of about 520 nm. A second rylene dye when illuminated with the 470 nm wavelength light of the second LED emits green light at a wavelength of above 520 nm. A third rylene dye when illuminated with the 480 nm wavelength light of the third LED emits a blue light at a wavelength of about 480 nm. Each of the first, second and third rylene dyes are selected to react with one of the three LEDs at a specific wavelength to generate a light output at a designated wavelength. The rylene dyes may be selected to react with certain wavelengths of blue light to generate a resulting color mix. The first, second and third rylene dyes may be painted or otherwise applied onto the plastic lens 32 and may be formed stacked one on top of another. Examples of energy conversion and the use of rylene dyes for color mixing are disclosed in one or more of U.S. Pat. Nos. 8,415,642; 8,247,761; 8,232,533; 8,178,852; 8,097,843, U.S. Patent Application Publication Nos. 2011/0012062; and 2015/0138789, the entire disclosures of which are hereby incorporated herein by reference. Use of the rylene dye for color mixing allows for the use of less expensive blue LEDs. It should further be appreciated that if the dye coating is translucent, then the first and second dyes may be utilized without the third dye, such that the resulting blue color output comes from the blue LED transmitted through the translucent plastic lens 32. Red, green, blue (RGB) light is then produced from the three (3) blue LEDs. As is commonly known by mixing red, green and blue light, any color light may be obtained. The red, green and blue light can be mixed in different proportions to generate other color lighting.

This lighting assembly allows for the use of cost-effective and efficient LEDs to achieve a desired light illumination. According to other embodiments, different colored light sources, such as LEDs, may be employed to generate a desired light output. For example, alternative red, green, and blue LED packaging having a red LED, a green LED and a blue LED may be used to generate desired colors of light outputs when used in combination, according to known light color mixing techniques.

Referring to FIG. 4, the vehicle wheel illumination assembly 20 is shown generating a first color light illumination on the outer walls of wheel assembly 15 including a tire 12 and wheel 18 and ground surface shown by lighting field 22. In this example, a green color light is illuminated within field 22 and onto the wheel assembly 15 to indicate that the tire inflation pressure of tire 12 is of a pressure exceeding a low pressure limit. The first light could be a white light, according to another example. As such, an operator of the vehicle 10 when approaching the vehicle is presented with a visual indication that the tire pressure is adequate. The tire pressure indication may be presented when the vehicle 10 is not operating and an operator is approaching the vehicle 10, such as when the operator activates the door unlock input button on a key fob.

Figure 5:
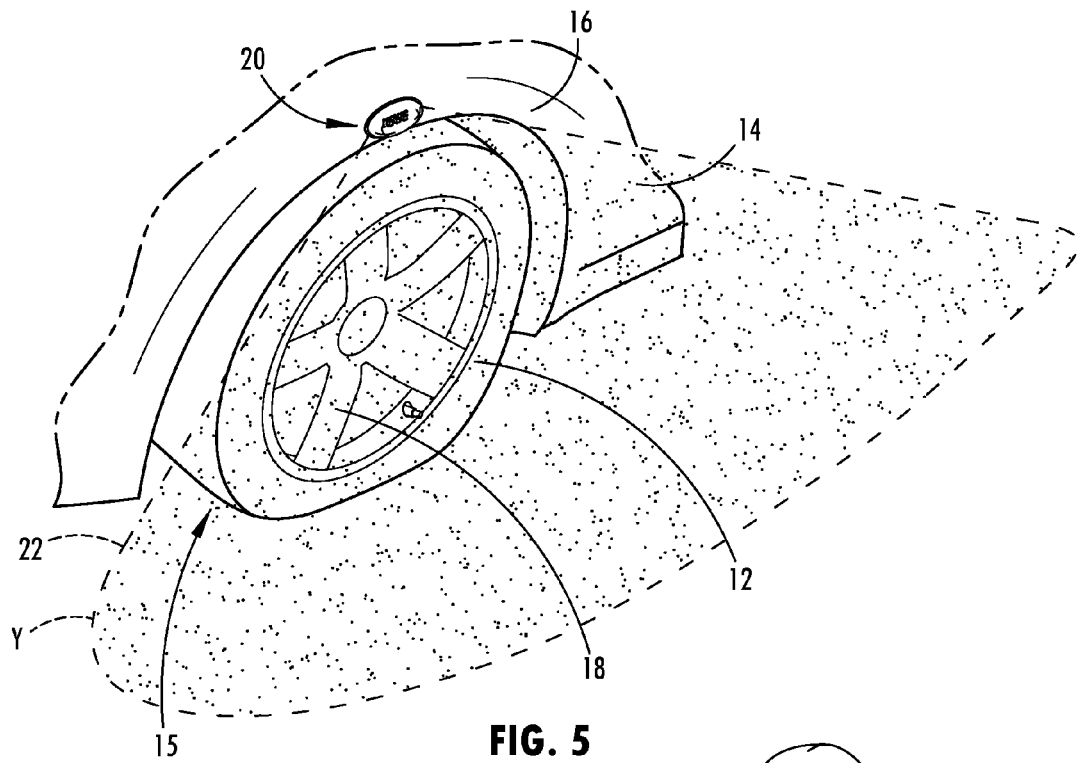
FIG. 5 is an enlarged perspective view of a portion of the vehicle body illustrating one of the wheel wells and lamp assembly for illuminating the wheel assembly for a flat tire indication.

Referring to FIG. 5, the vehicle wheel illumination assembly 20 is shown generating a different second color light illuminated onto the outer walls of the wheel assembly 15 including the tire 12 and surrounding ground surface. In this example, the tire 12 is shown as underinflated having an inflation tire pressure of less than the low pressure limit, also referred to as a flat tire. When the tire pressure is detected as being underinflated, the assembly 20 generates a yellow color light illuminated onto the outer walls of the wheel assembly 15 and its tire 12 and onto the ground surface within lighting field 22 so that an operator of the vehicle 10 approaching the vehicle 10 may readily recognize the flat tire indicator.

Figure 6:
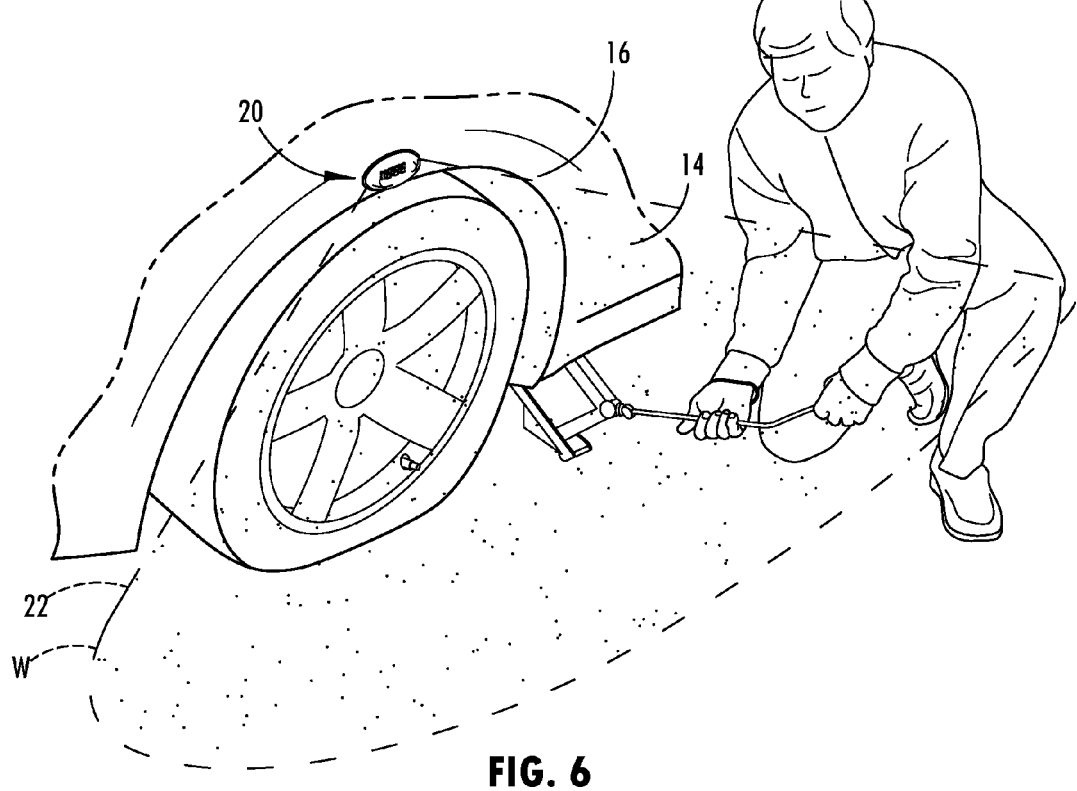
FIG. 6 is an enlarged perspective view of a portion of the vehicle body illustrating one of the wheel wells and lamp assembly for illuminating the wheel assembly for a service light.

Referring to FIG. 6, the vehicle wheel illumination assembly 20 is shown operating as an area light to generate light illumination within a lighting field 22 which also illuminates the wheel assembly 15 including the tire 12 and ground surface. The area light enables an operator to service the vehicle such as inflating or changing the flat tire. The area light may include a third different color light illumination, such as a white light.

It should further be appreciated that the wheel illumination assembly 20 further may be activated to provide puddle lamp lighting when an operator of the vehicle is determined to be approaching the vehicle to enable the operator to enter and exit the vehicle 10. The puddle lamp application may generate a white light or other color light on the wheel assembly 15 and its tires 12 and nearby ground surface. Further, the wheel illumination assembly 20 may generate a desired color lamp to be used as a turn signal indicator when a turn signal is generated while the vehicle is driven. As such, one or more of the wheel illumination assemblies 20 may flash to signal a turn signal as a substitute or in addition to the vehicle turn signals.

Figure 7:
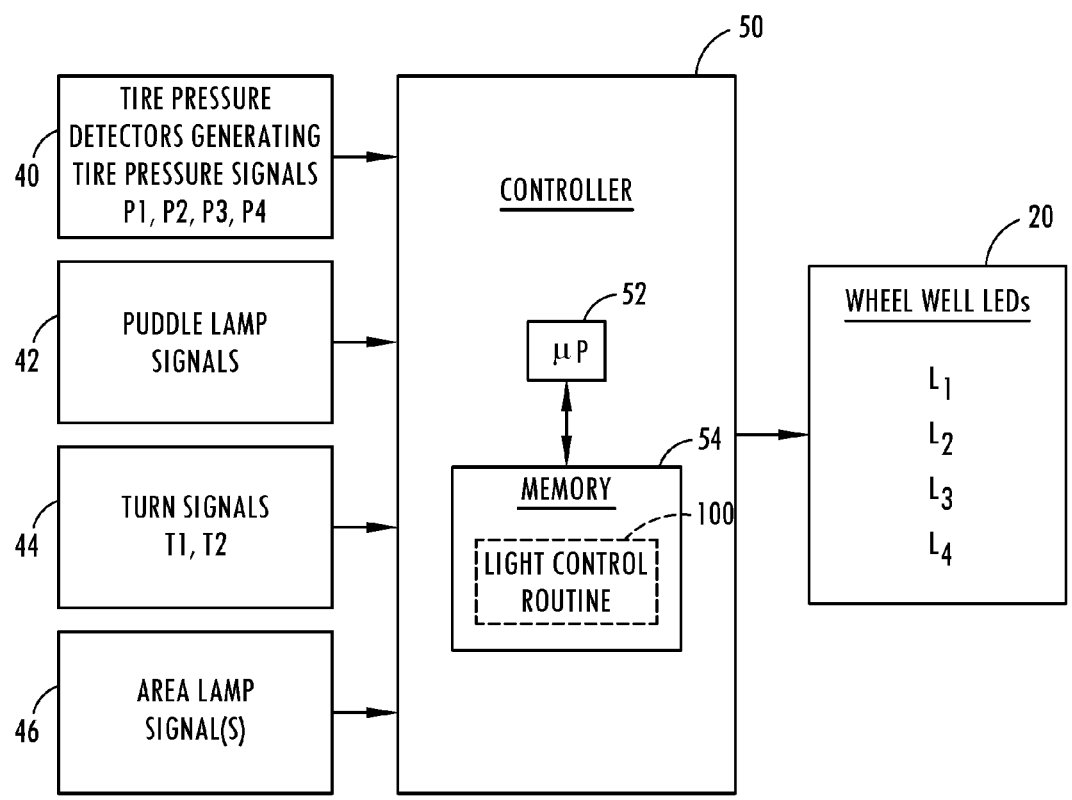
FIG. 7 is a block diagram illustrating the lamp assemblies and controls for providing tire pressure indication, puddle lamp illumination, and turn signal indication, according to one embodiment.

The vehicle wheel illumination assemblies 20 are shown in FIG. 7 controlled by a controller 50 in response to various inputs. The wheel illumination assemblies 20 each include light sources shown as wheel well LEDs L1-L4 located near wheels for lighting the corresponding tire 12 and wheel assemblies 15. The controller 50 is shown including control circuitry in the form of a microprocessor 52 and memory 54. A light control routine 100 is shown stored in memory 54 and executable by the microprocessor 52. The microprocessor 52 or other control circuitry processes the various inputs and the light control routine 100 and generate outputs to control the wheel well LEDs L1-L4 of the vehicle wheel illumination assemblies 20. It should be appreciated that other analog and/or digital circuitry may be employed to process the various inputs and routines to activate the vehicle wheel illumination assemblies 20.

The inputs to controller 50 include tire pressure signals P1-P4 which are generated by respective tire pressure detectors associated with each tire 12. Each wheel assembly has a tire and a tire pressure detector for detecting the air inflation pressure of the tire 12. As such, four tire pressure detectors are employed to detect four tire pressure signals P1-P4. In addition, puddle lamp signals 42 are input to the controller 50 indicative of a desired activation of puddle lamps. Further, two turn signals T1-T2 are input to the controller 50 indicative of the desired turn indication for when the driver indicates the vehicle is to turn to the left or the right. As such, the two left side wheel illumination assemblies flash light to indicate a left turn and the two right side wheel illumination assemblies flash light to indicate a right turn. Further, one or more area lamp signals 46 may be input to the controller 50 indicative of the driver requesting activation of wheel area lamp lighting. The controller 50 processes the various inputs 40-46 pursuant to the light control routine 100 to activate the vehicle wheel illumination assemblies 20 as described herein.

Figure 8:
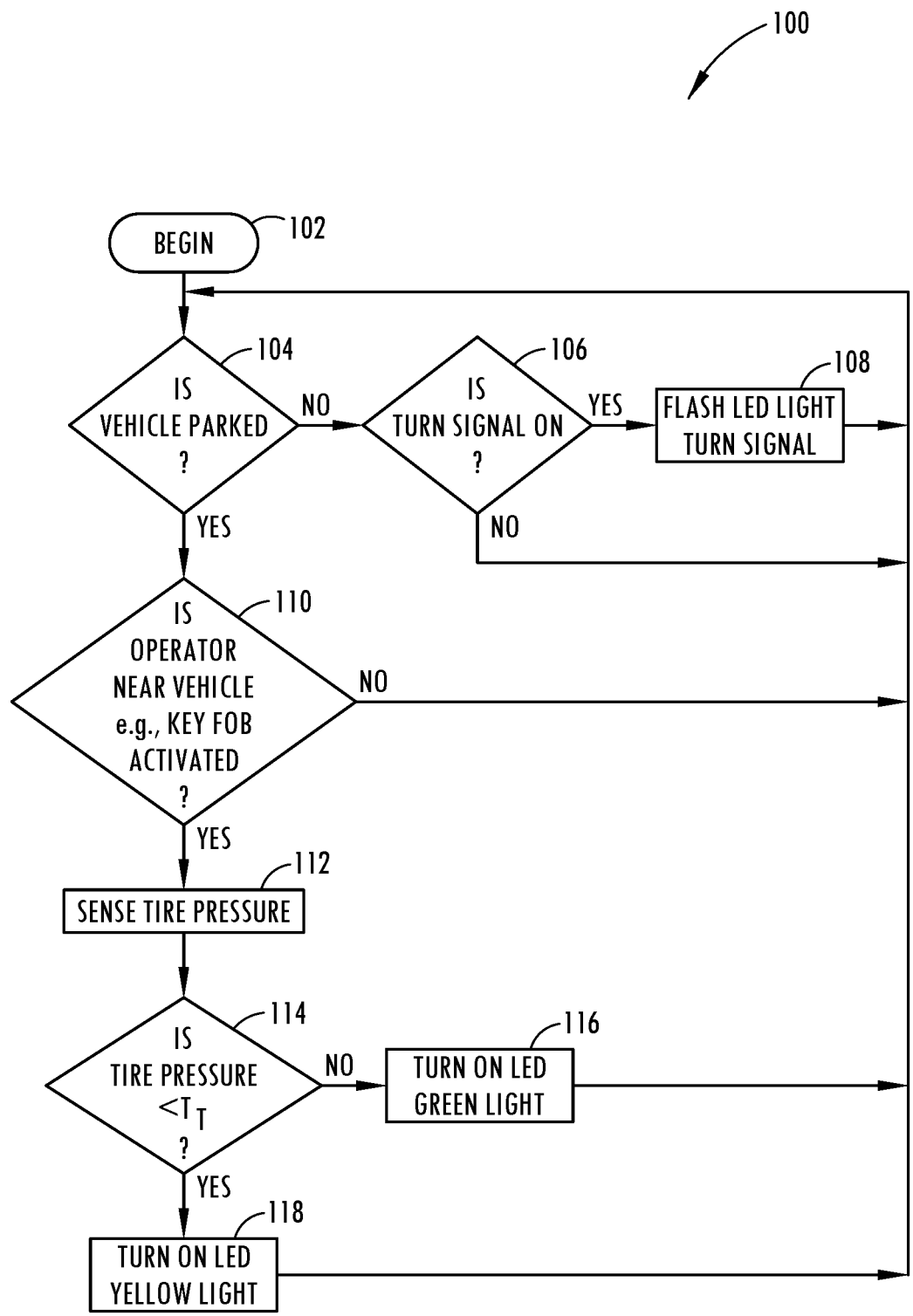
FIG. 8 is a flow diagram illustrating a routine for providing lighted tire pressure indication, puddle lamp illumination, and turn signal indication, according to one embodiment.

Referring to FIG. 8, the light control routine 100 for controlling the vehicle wheel illumination assembly is illustrated, according to one embodiment. Routine 100 begins at step 102 and proceeds to decision step 104 to determine if the vehicle is parked. If the vehicle is not parked, routine 100 will proceed to decision step 106 to determine if a turn signal is on and, if so, will flash the LED light as a turn signal indicator at step 108 to indicate a desired turning direction before returning to step 104. The turn signal indicator may include flashing the light sources associated with the wheel illumination assemblies 20 on the same side of the vehicle as the vehicle is expected to turn. If the turn signal is not on, routine 100 returns to step 104.

If the vehicle is parked as determined at step 104, routine 100 proceeds to decision step 110 to determine if the operator is near the vehicle. This may include detecting activation of the key fob such as a door unlock button which would indicate that the operator is near the vehicle. If the operator is not near the vehicle, routine 100 returns to step 104. If the operator is determined to be near the vehicle, routine 100 proceeds to step 112 to sense tire pressure for each of the tires on the vehicle. Next, at decision step 114, routine 100 determines if the sensed tire pressure is less than a tire pressure threshold $T_T$. If the tire pressure is not less than tire pressure threshold $T_T$, routine 100 proceeds to step 116 to turn on the LED light associated with that tire with a green light indicative of sufficient tire pressure, before returning to step 104. If the sensed tire pressure is less than the tire pressure threshold $T_T$, routine 100 proceeds to step 118 to turn on the LED light associated with that tire with a yellow light indicative of a low tire pressure, prior to returning to step 104.

Accordingly, the vehicle wheel illumination assembly 20 in the above described embodiment advantageously provides for a light indication of the tire pressure by illuminating the wheel assembly 15 including the tire with a light source mounted on the vehicle body to indicate the tire pressure status. This enables the operator of the vehicle to confirm adequate tire inflation pressure or to become aware of a low tire pressure situation while the operator is not within the vehicle cabin such that the operator may take corrective action to inflate the tire or change the tire prior to operating the vehicle. The illumination assembly 20 advantageously provides for the addition of puddle lamp lighting, turn signal indication, and area lighting which advantageously allows for integration of such lighting functions.

Figure 10:
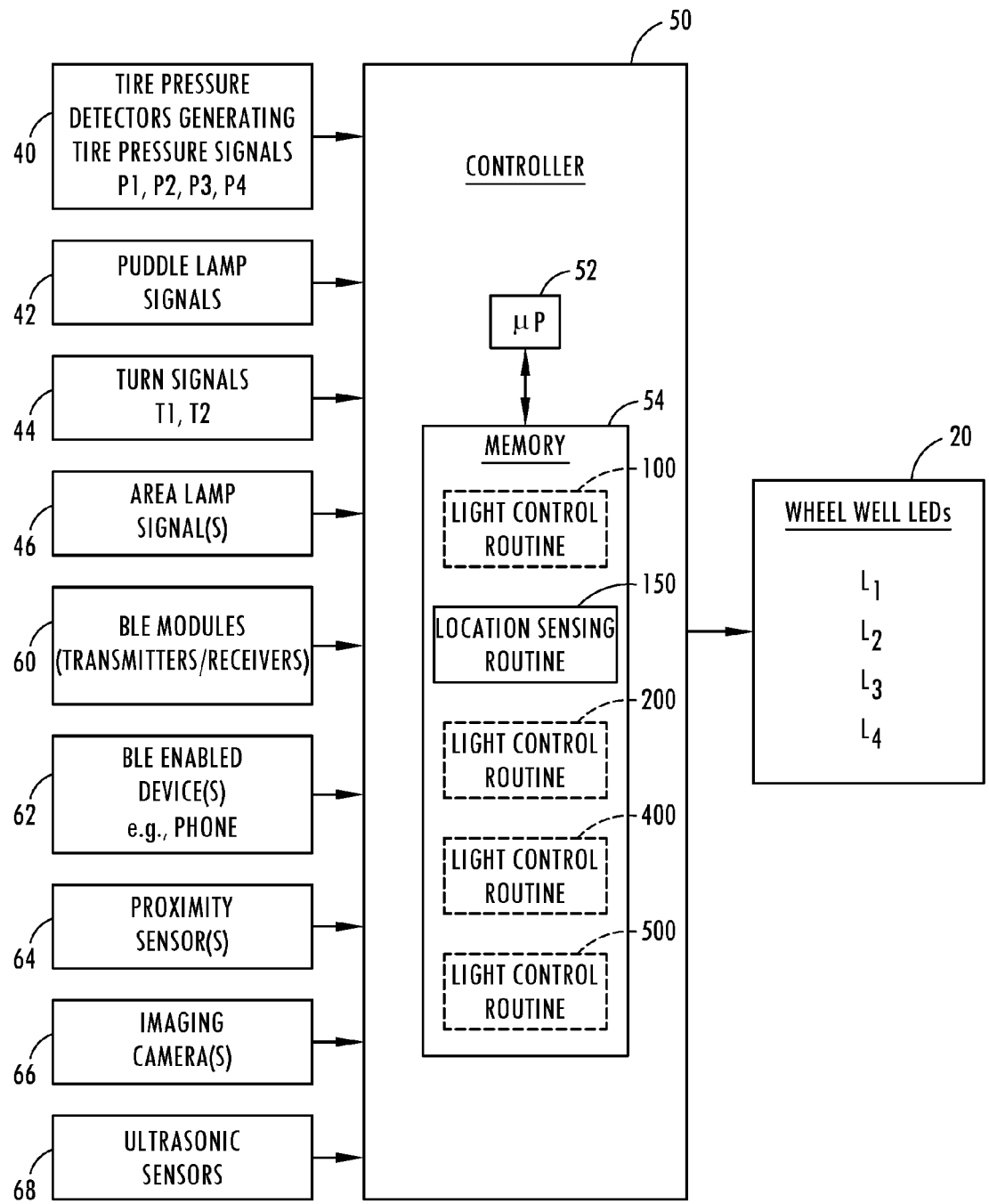
FIG. 10 is a block diagram illustrating the lamp assembly and controls for detecting the person and providing lighting control to assist with servicing the tire.

Referring to FIGS. 9-11, the vehicle wheel illumination assembly 20 is illustrated according to another embodiment. In this embodiment, the vehicle wheel illumination assembly 20 employs the light source located on the wheel well 16 of the vehicle body 14 and arranged to illuminate a wheel assembly 15 of the vehicle 10. The vehicle wheel assembly is configured to indicate tire air pressure status and to further control the lighting to assist a person 80, such as a vehicle operator (i.e., driver), with servicing of the tire 12, such as inflating the tire 12 or replacing the entire wheel assembly 15 and thereby changing the tire. The vehicle wheel illumination assembly 20 includes a sensor arrangement having one or more sensors for sensing a location of a person 80 near one of the wheel assemblies 15. The sensor arrangement includes one or more sensors that may sense a person near the wheel assembly 15 and the assembly presumes that the person 80 is attempting to service the tire 12 or wheel assembly 15. The vehicle wheel illumination assembly 20 further includes a controller for controlling the light source to illuminate the wheel assembly 15 when the person 80 is detected near to the wheel assembly 15 to enable the servicing of the tire 12. The person 80 may be considered near the wheel assembly 15 when the person 80 is within a predetermined distance such as three (3) feet, according to one example. However, the distance may be five (5) feet or less or some greater distance.

As seen in FIG. 9, the vehicle 10 is equipped with one or more sensors for sensing a person near one or more of the wheel assemblies 15 of the vehicle 10. The sensors may include wireless communication transceivers such as Bluetooth Low Energy (BLE) modules 60 which may be associated with various devices onboard the vehicle, according to one embodiment. According to another embodiment, the sensors may include proximity sensors, such as capacitive sensors 60, located at various locations around the vehicle, such as within the window glass or body of the vehicle. According to a further embodiment, the sensors may include one or more imaging cameras 66 located on the vehicle 10. According to yet a further embodiment, the sensors may include ultrasonic sensors 68. It should be appreciated that the sensors may include one or more of the BLE modules 60, proximate sensors 64, imaging cameras 66, and ultrasonic sensors 68 in various combinations. It should further be appreciated that other types of sensors such as radar and other sensing configurations may be employed for sensing a person near one or more of the wheel assemblies 15.

In the embodiment shown in FIG. 9, various BLE modules 60 are shown located within various devices onboard the vehicle 10. The BLE modules 60 may be located in or otherwise associated with an illuminated badge 72 at the rear of the vehicle, an illuminated badge 70 at the front of the vehicle, various wheel lamps 20, map lamps 74, and a body controller 76, and may be located at other locations. The BLE modules 60 each include a transceiver having a transmitter and a receiver to transmit BLE signals and receive BLE signals which may communicate wirelessly with one or more electronic devices 62, such as a smartphone having Bluetooth or other wireless communication capability. It should further be appreciated that the BLE modules 60 may communicate with any device having Bluetooth capability and that other wireless forms of communication may be used. A person 80, such as a driver of the vehicle, may possess a BLE enabled device 62 having wireless communication Bluetooth capability which may communicate with each of the various BLE modules 60 onboard the vehicle 10. The BLE modules 60 may track the location or the distance to the wireless BLE enabled device 62 and send the BLE signals indicative thereof to the body controller 76. The body controller 76 may process each of the BLE signals and may determine a location of the BLE enabled device 62 relative to the vehicle 10, and may determine whether the person 80 is near a wheel assembly 15 based on the sensed location of the BLE enabled device 62. The location of the BLE enabled device 62 may be determined by processing the BLE signals communicating with the BLE enabled device 62 using triangulation of signals from a plurality of BLE modules 60. Accordingly, the BLE modules 60 may advantageously track the location of a person 80 possessing a BLE enabled device 62 as the person 80 moves around outside the vehicle 10 and within the vehicle 10. It should be appreciated that other BLE enabled devices other than smartphones such as BLE enabled watches or fitbands may be used to determine the location of the device and hence the person in possession of the device.

According to the proximity sensing embodiment, proximity sensors 64, such as capacitive sensors, may be located in the window glass associated with the windows and/or body panels of the vehicle 10 and may detect the location and direction of movement of a person in close proximity to the windows or body panels of the vehicle and determine if the person 80 is progressing toward and is near a wheel assembly 15. One example of a proximity sensing arrangement employing capacitive sensors in a window for detecting a person and movement of the person is disclosed in U.S. patent application Ser. No. 14/825,603, filed on Aug. 13, 2015, entitled "METHOD AND SYSTEM FOR CONTROLLING VEHICLE REAR DOOR," the entire disclosure of which is hereby incorporated by reference.

In the embodiment employing imaging cameras, one or more imaging cameras 66 may be located at various locations around the vehicle to capture images of areas proximate to the vehicle 10 and the wheel assemblies 15. Imaging cameras 66 are shown located on forward and rearward sides of the exterior mirror housing to capture images near the front and rear wheel assemblies 15. The imaging cameras 66 may be located in the bumpers, body panels, mirror housings, tail lamp assemblies, and other locations. The imaging cameras 66 may process the captured images to determine when a person is detected near a particular wheel assembly 15.

According to the ultrasonic sensor embodiment, one or more ultrasonic sensors 68 may be located on the vehicle 10 and positioned to detect a person near a wheel assembly 15. The ultrasonic sensors 68 are shown located in the front and rear body panels. The ultrasonic sensors 68 may be located in the bumpers, the body panels, mirror housings, the tail lamp assemblies and other locations. It should be appreciated that other sensors such as radar and others may be employed to detect a person near the wheel assembly 15.

Referring to FIG. 10, the vehicle wheel illumination assembly 20 is illustrated employing the controller 50 having various inputs as described above in connection with the first embodiment. In addition, the controller 50 further receives as input signals from the proximity sensors 64, the BLE modules 60, the ultrasonic sensors 68, and/or the imaging cameras 66. The BLE enabled devices 62 may also communicate with the controller 50 as well as communicating with the BLE modules 60. The controller 50 may be a dedicated controller or may be a shared controller such as the vehicle body control module (BCM). The controller 50 executes one or more routines stored in memory 54 which includes a light control routine 200. In addition, a BLE location sensing routine 150 may be stored in memory 54 and executed by microprocessor 52 to determine the location of a BLE enabled device 62 detected with the BLE signals. The BLE location sensing routine 150 may process the BLE signals and perform triangulations to determine the location of a BLE enabled device 62 (e.g., smartphone), and hence the person in possession of the device 62, according to the BLE embodiment. The controller 50 determines the location of a person near the wheel assembly based on the sensor outputs and controls the light source 20 to illuminate the wheel assembly to indicate a tire air pressure status and further controls the light source to illuminate the wheel assembly when a person is detected proximate to the wheel assembly to enable servicing of the tire. The controller 50 may control the light source to generate a first color light (e.g., red or amber) to indicate a low tire air pressure when the tire air pressure is below a pressure limit. The controller 50 may control the light source to illuminate a different second color light (e.g., white light) when a person is detected near the wheel assembly. The controller 50 may further control the light source to illuminate the wheel assembly with a different third color light (e.g., green light) to indicate sufficient tire air pressure when the tire pressure is above the pressure limit.

Figure 11A:
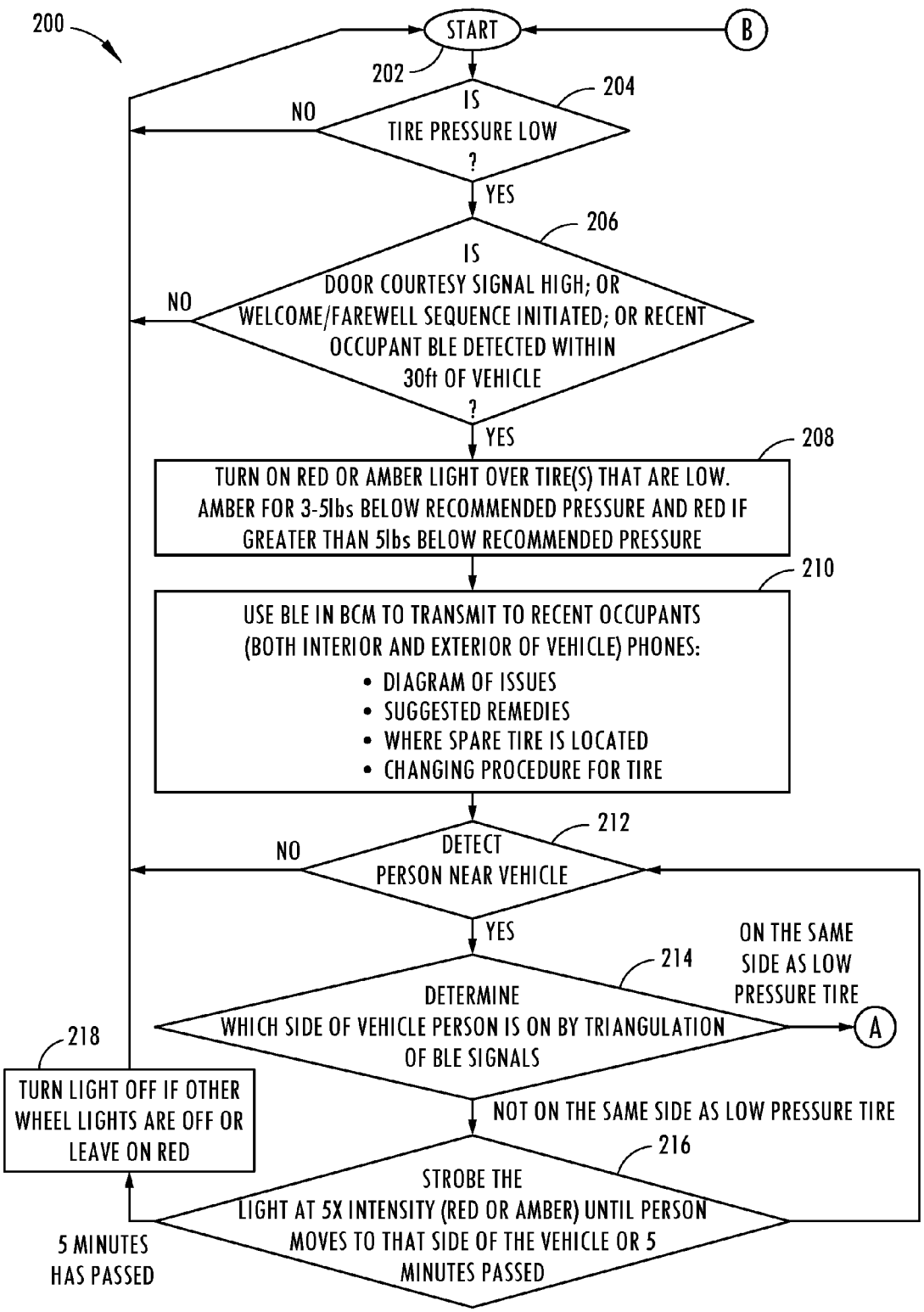
FIGS. 11A-11B is a flow diagram illustrating a routine for providing lighting control to illuminate the wheel assembly and enable servicing of the tire, according to another embodiment.
Figure 11B:
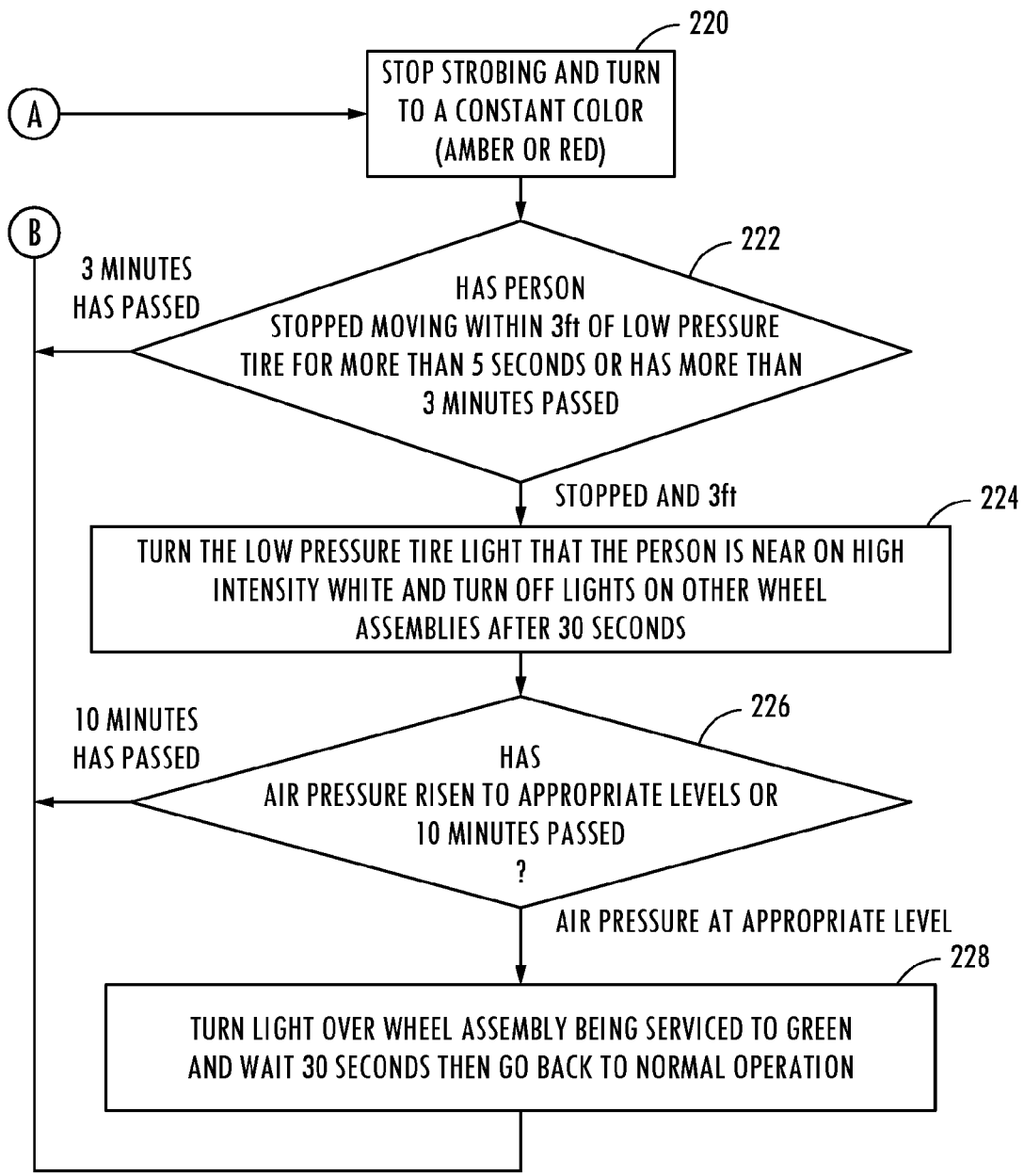

Referring to FIGS. 11A-11B, the light control routine 200 is illustrated for controlling the light source to illuminate the wheel assembly when a person is detected near the wheel assembly, according to one embodiment. Light control routine 200 begins at step 202 and proceeds to step 204 to determine if the tire air pressure is low and, if not, returns to step 202. If the tire air pressure is determined to be low, routine 200 proceeds to decision step 206 to determine if the door courtesy signal is high or if the welcome/farewell sequence is initiated or if a recent or designated occupant BLE enabled device is detected within thirty (30) feet of the vehicle, and if none of the aforementioned conditions are met routine 200 returns to step 202. If any of the conditions of decision 206 are met, routine 200 proceeds to step 208 to turn on the red or amber color light over the tire or tires that are low to illuminate the wheel assembly or assemblies, including the tire and the ground nearby. The amber color light may be generated when the tire has three (3) to five (5) pounds of tire pressure below the recommended tire air pressure, whereas the red color light may be generated if the tire air pressure is more than five (5) pounds below the recommended tire air pressure. Next, at step 210, the BLE module in the body control module (BCM) or other controller may transmit to recent occupant detected Bluetooth BLE enabled devices, e.g., smartphones, a diagram of which tire or tires are at issue, may suggest remedies such as changing the wheel assembly and hence the tire if there is a rapid loss of tire pressure or inputting air into the tire if there is a slow leak, may show where the spare tire is located and how to access it, and may provide a changing procedure for the tire. Accordingly, the user may utilize the phone or other wireless communication BLE enabled device to receive instructions for remedial action to enable servicing of the tire.

Next, routine 200 proceeds to decision step 212 to detect a person near the vehicle (e.g., car), such as within thirty (30) feet. If a person is not detected near the vehicle, routine 200 returns to step 202. If a person is detected near the vehicle, routine 200 proceeds to decision step 214 to determine which side of the vehicle the person is detected on. This may be achieved by using one or more of the sensors. When using the BLE modules, a triangulation of the BLE transmitters relative to the BLE enabled device may be performed to determine the location of the BLE enabled device and hence the person possessing the BLE enabled device. If the person is determined not to be on the same side of the vehicle as the tire needing servicing, routine 200 proceeds to decision step 216 to strobe the light of the wheel assembly facing the person and opposing the wheel assembly needing service at an increased intensity (e.g., five (5) times greater) red or amber color until the person moves to the side of the vehicle having the low tire pressure issues within a time period such as five (5) minutes as determined by decision step 216. If the person does not move to the side of the vehicle having the low tire pressure issues within five (5) minutes, routine 200 turns the light off if the other wheel lights are off or leaves the light on red color at step 218 before returning to step 202.

If the person is determined to be on the same side of the vehicle as the low pressure tire at issue, routine 200 proceeds to step 220 to stop strobing the light and to turn on a constant color light, such as an amber or red light. Next, at decision step 222, routine 200 determines if the person has stopped moving within a predetermined distance of the wheel assembly, such as three (3) feet of the low pressure tire, for more than five (5) seconds or if more than three (3) minutes has passed. If more than three (3) minutes has passed, routine 200 returns to step 202. If the person has stopped moving within three (3) feet of the low pressure tire for more than five (5) seconds, routine 200 proceeds to step 224 to turn the low pressure tire light that the person is near on high intensity white light and turn off lights on the other wheel assemblies after thirty (30) seconds. This enables the person to service the tire with a white light which may include adding increased air pressure into the tire or replacing the tire by using the while light illumination. Next, at decision step 226, routine 200 determines if the tire air pressure has risen to the appropriate level or if ten (10) minutes has passed, or if the user has left the site. If ten (10) minutes have passed, or the user left the site, routine 200 returns to step 202. If the tire air pressure has risen above the appropriate level, routine 200 proceeds to step 228 to turn the light over the wheel assembly being serviced to green and waits thirty (30) seconds and then goes back to normal operation. Accordingly, once the wheel assembly is fully serviced, the wheel illumination light illuminates a green light on the wheel assembly.

Accordingly, the vehicle wheel illumination assembly 20 advantageously provides for a light indication of the tire air pressure by illuminating the wheel assembly 15 with a first color light to indicate low tire air pressure when the tire air pressure is below a low pressure limit, and changes to a different second color light when a person is detected near the wheel assembly to enable the person to service the tire. Additionally, the assembly advantageously further illuminates the wheel assembly with a different third color light to indicate sufficient tire pressure when the tire air pressure is above the low pressure limit. As such, a user may readily identify a tire maintenance issue and may service the tire with light controlled by the vehicle wheel illumination assembly 20.

Referring to FIGS. 12A-12D, the vehicle wheel illumination assembly 20 is illustrated employing a photoluminescent structure 310 having a photoluminescent material on the wheel assembly 15, according to a first embodiment. In this embodiment, the vehicle wheel illumination assembly 20 employs a light source 24 located on the wheel well 16 of the vehicle body 14 and arranged to illuminate a wheel assembly 15 of the vehicle. The vehicle wheel assembly 15 may thereby be illuminated with enhanced lighting to create a desired illumination and aid in servicing of the wheel assembly 15. The wheel assembly 15 is configured to include a photoluminescent structure 310 having photoluminescent material that is configured to luminesce in response to excitation by the light source 24. The controller 50 (FIG. 10) may control the light source 24 to illuminate the wheel assembly 15 to cause the photoluminescent structure 310 to luminescence in response to the excitation by the light source 24 to enhance the lighting of the wheel assembly 15 and the nearby surrounding area.

Figure 12A:
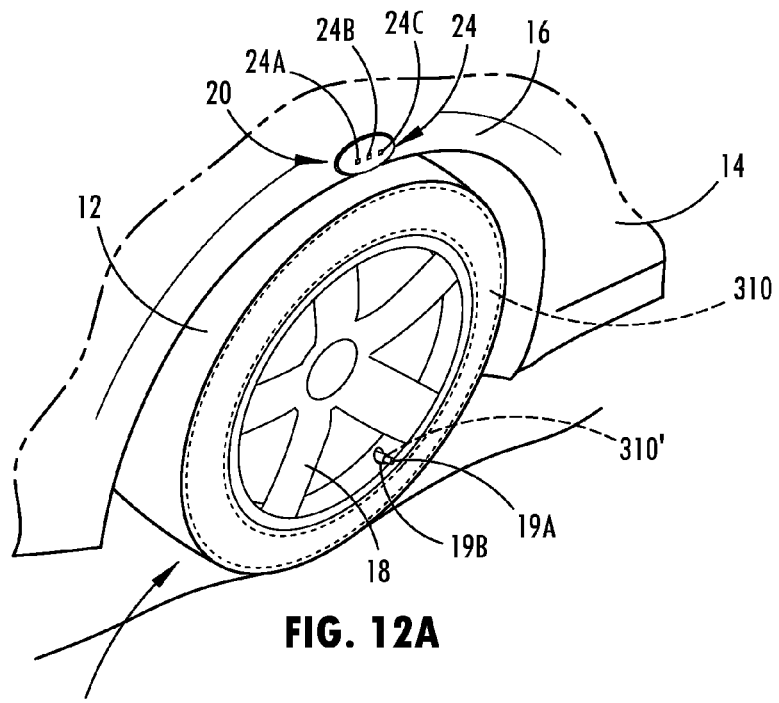
FIG. 12A is a perspective view of a portion of the vehicle body illustrating a lamp assembly for illuminating a wheel assembly with a photoluminescent structure on the tire, according to one embodiment.

As seen in FIG. 12A, the photoluminescent structure 310 is located on a side wall of the tire 12 and includes a first photoluminescent material, according to one embodiment. The photoluminescent structure 310 may be coated or adhered to the side wall of the tire 12 or laminated or otherwise applied onto or within the tire 12. The photoluminescent structure 310 may be shaped in a ring-shaped pattern or may be applied in any other pattern. In one embodiment, the photoluminescent structure 310 may be applied on the outward protruding (i.e., raised) letters on the side wall of the tire 12. In addition or as an alternative, the photoluminescent structure 310 may be located on the wheel 18, such as on the spokes, rim and/or hub of the wheel 18. The photoluminescent structure 310 is located on the wheel assembly 15 in a position such that the light source 24 may illuminate the photoluminescent structure 310 and thereby activate the photoluminescent structure 310 to provide a luminescence effect for illuminating the wheel assembly 15.

Figure 12B:
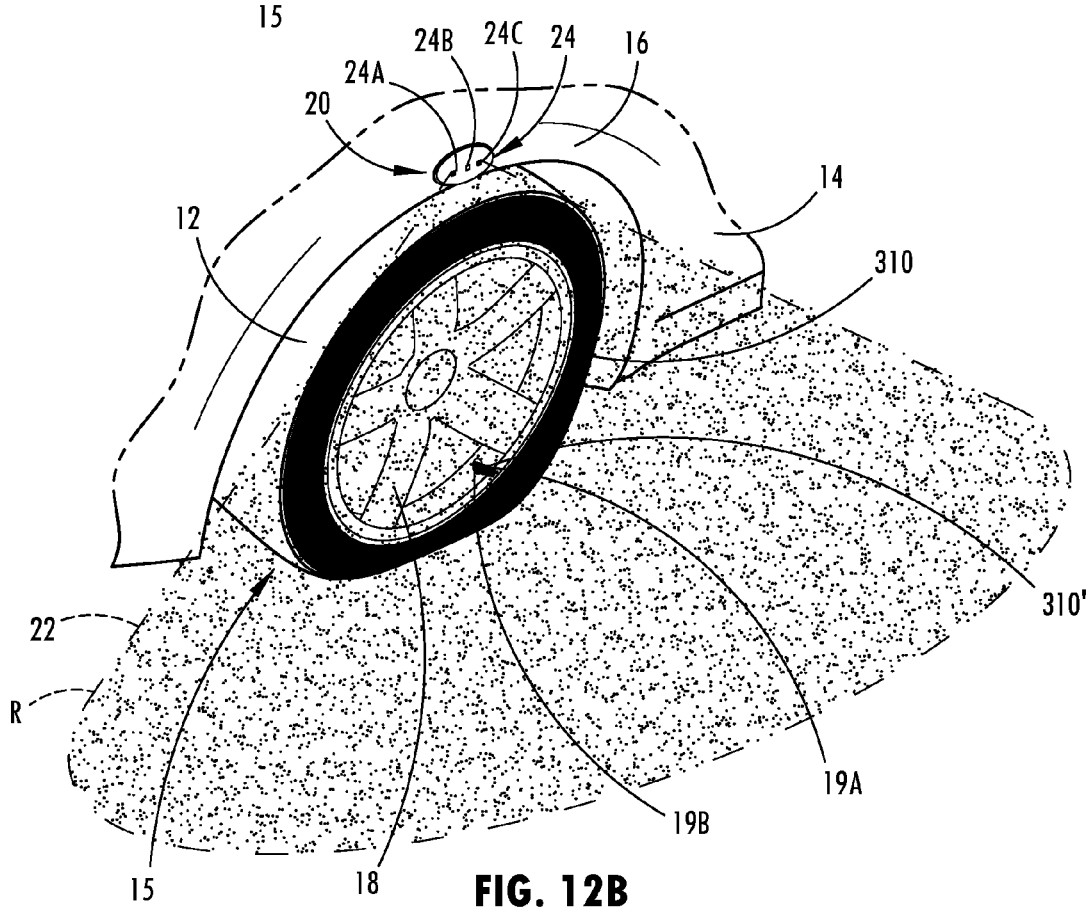
FIG. 12B is a perspective view of the portion of the vehicle body shown in FIG. 12A with the tire and valve stem and cap illuminated with a photoluminescent structure and with a first red light.

In FIG. 12B, the wheel assembly 15 is shown having the light source 24 illuminating the wheel assembly 15 with a first color light output, such as a red light shown by lighted region R, indicative of a tire that requires servicing, such as an underinflated tire. The light source 24 also turns on a blue LED to generate blue light at a reduced intensity such as 10% of the total light output. The blue light causes the first photoluminescent material on the tire side wall to glow white color. In addition to coating the side wall of the tire 12, the wheel assembly 15 may include a photoluminescent structure 310' having a second photoluminescent material located on the tire valve stem 19B and valve stem cap 19A such that the valve stem 19B and cap 19A luminesce in a red color when excited with the blue light. This enables a person to readily service the tire 12 with the enhanced lighting provided from the luminescent effect and to locate the valve stem 19B to enable tire inflation through the valve stem and to locate the cap 19A during servicing of the tire 12. The first and second photoluminescent materials are selected to generate white and red light, respectively, when excited by the blue light, according to one embodiment.

Figure 12C:
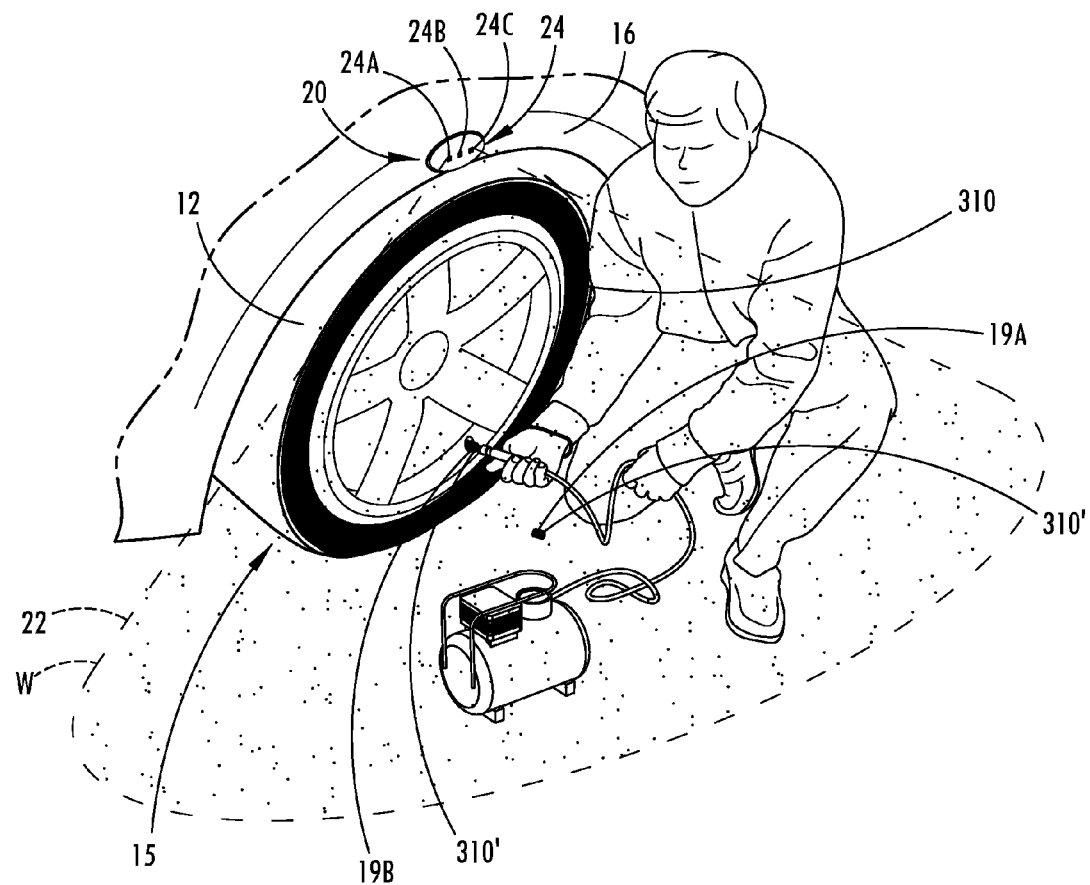
FIG. 12C is a perspective view of the portion of the vehicle body shown in FIG. 12A with the tire and valve stem and cap illuminated and with a second white light for enabling servicing of the tire.

When the tire 12 requires servicing, the wheel assembly 15 and nearby area may be illuminated with a second color light as shown in FIG. 12C. The second color light may include a white or bluish white light that enables a person to service the tire 12 as shown by lighted region W. The bluish white light may be a high color temperature light of about 8000 k. The tire valve cap 19A is shown illuminated on the ground and therefore may be easily located during the servicing of the tire 12. The wheel assembly 15 and the nearby surrounding area may be illuminated with the second color (e.g., white) light while the first photoluminescent structure 310 on the tire 12 illuminates in white light and the second photoluminescent structure 310' on the valve stem 19B and cap 19A are illuminated in a different red color when excited by the blue light (~450 to 495 nanometers in wavelength).

Figure 12D:
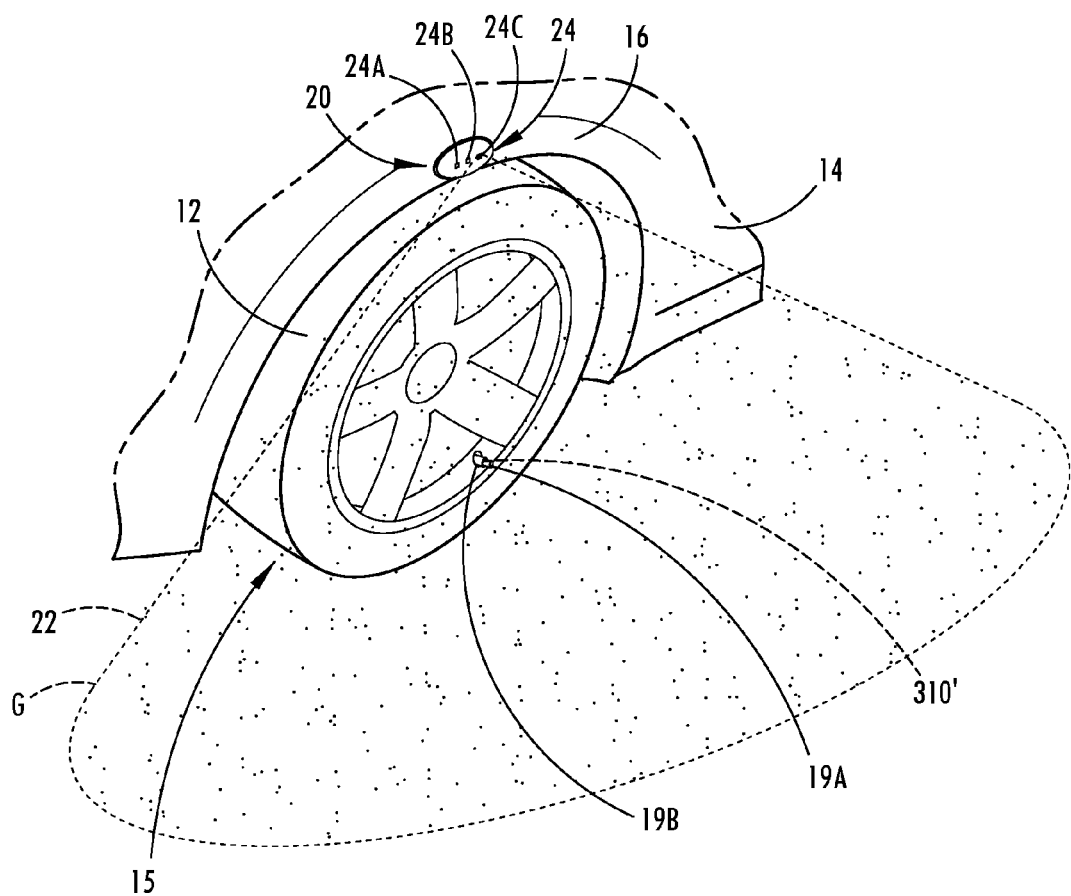
FIG. 12D is a perspective view of the portion of the vehicle body shown in FIG. 12A further illustrating the wheel assembly illuminated with a third green light.

Once the wheel assembly 15 is fully serviced and the tire inflation reaches the proper inflation level, the light source 24 may illuminate the wheel assembly 15 and nearby area with a third color light, such as a green light generated by a green LED and indicative of a fully serviced tire, as shown by lighted region G in FIG. 12D. The green light causes partial activation of the second photoluminescent material to cause the valve stem 19B and cap 19A to illuminate in red color.

Figure 13A:
FIG. 13A is a side view of a photoluminescent structure rendered as a coating for use on the wheel assembly, according to one embodiment.
Figure 13B:
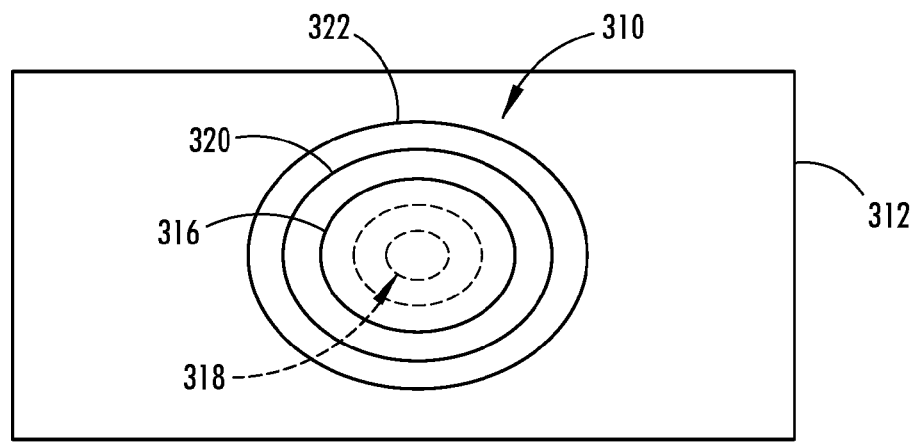
FIG. 13B is a top view of a photoluminescent structure rendered as a discrete particle, according to one embodiment.
Figure 13C:
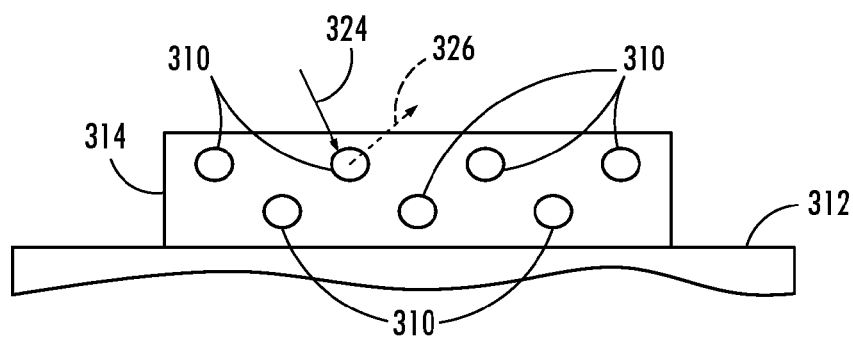
FIG. 13C is a side view of a plurality of photoluminescent structures rendered as discrete particles and incorporated into a separate structure.

Referring to FIGS. 13A-13C, various exemplary embodiments of photoluminescent structures 310 are shown, each capable of being coupled to a substrate 312, which may correspond to a vehicle fixture or vehicle related piece of equipment such as the tire 12, wheel 18, valve stem 19B or cap 19A. In FIG. 13A, the photoluminescent structure 310 is generally shown rendered as a coating (e.g., a film) that may be applied to a surface of the substrate 312. In FIG. 13B, the photoluminescent structure 310 is generally shown as a discrete particle capable of being integrated with a substrate 312. In FIG. 13C, the photoluminescent structure 310 is generally shown as a plurality of discrete particles that may be incorporated into a support medium 314 (e.g., a film) that may then be applied (as shown) or integrated with the substrate 312.

At the most basic level, a given photoluminescent structure 310 includes an energy conversion layer 316 that may include one or more sublayers, which are exemplarily shown through broken lines in FIGS. 13A and 13B. Each sublayer of the energy conversion layer 316 may include one or more photoluminescent materials 318 having energy converting elements with phosphorescent or fluorescent properties. Each photoluminescent material 318 may become excited upon receiving an excitation light 324 of a specific wavelength, thereby causing the light to undergo a conversion process. Under the principle of down conversion, the excitation light 324 is converted into a longer wavelength, converted light 326 that is outputted from the photoluminescent structure 310. Conversely, under the principle of up conversion, the excitation light 324 is converted into a shorter wavelength light that is outputted from the photoluminescent structure 310. When multiple distinct wavelengths of light are outputted from the photoluminescent structure 310 at the same time, the wavelengths of light may mix together and be expressed as a multicolor light.

Light emitted by the light source made up of LEDs 24A-34C (FIG. 3) is referred to herein as excitation light 24 and is illustrated in FIG. 13C as a solid arrow. In contrast, light emitted from the photoluminescent structure 310 is referred to herein as converted light 26 and is illustrated in FIG. 13C as a broken arrow. The mixture of excitation light 324 and converted light 326 that may be emitted simultaneously is referred to herein as outputted light.

The energy conversion layer 316 may be prepared by dispersing the photoluminescent material 318 in a polymer matrix to form a homogenous mixture using a variety of methods. Such methods may include preparing the energy conversion layer 316 from a formulation in a liquid carrier support medium 314 and coating the energy conversion layer 316 to a desired substrate 312. The energy conversion layer 316 may be applied to a substrate 312 by painting, screen-printing, spraying, slot coating, dip coating, roller coating, and bar coating. Alternatively, the energy conversion layer 316 may be prepared by methods that do not use a liquid carrier support medium 314. For example, the energy conversion layer 316 may be rendered by dispersing the photoluminescent material 318 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 312 using any methods known to those skilled in the art. When the energy conversion layer 316 includes sublayers, each sublayer may be sequentially coated to form the energy conversion layer 316. Alternatively, the sublayers can be separately prepared and later laminated or embossed together to form the energy conversion layer 316. Alternatively still, the energy conversion layer 316 may be formed by coextruding the sublayers.

In some embodiments, the converted light 326 that has been down converted or up converted may be used to excite other photoluminescent material(s) 318 found in the energy conversion layer 316. The process of using the converted light 324 outputted from one photoluminescent material 318 to excite another, and so on, is generally known as an energy cascade and may serve as an alternative for achieving various color expressions. With respect to either conversion principle, the difference in wavelength between the excitation light 324 and the converted light 326 is known as the Stokes shift and serves as the principle driving mechanism for an energy conversion process corresponding to a change in wavelength of light. In the various embodiments discussed herein, each of the photoluminescent structures 310 may operate under either conversion principle.

Referring back to FIGS. 13A and 13B, the photoluminescent structure 310 may optionally include at least one stability layer 320 to protect the photoluminescent material 318 contained within the energy conversion layer 316 from photolytic and thermal degradation. The stability layer 320 may be configured as a separate layer optically coupled and adhered to the energy conversion layer 316. Alternatively, the stability layer 320 may be integrated with the energy conversion layer 316. The photoluminescent structure 310 may also optionally include a protective layer 322 optically coupled and adhered to the stability layer 320 or other layer (e.g., the conversion layer 316 in the absence of the stability layer 320) to protect the photoluminescent structure 310 from physical and chemical damage arising from environmental exposure. The stability layer 320 and/or the protective layer 322 may be combined with the energy conversion layer 316 through sequential coating or printing of each layer, sequential lamination or embossing, or any other suitable means.

Additional information regarding the construction of photoluminescent structures 310 is disclosed in U.S. Pat. No. 8,232,533, the entire disclosure of which is incorporated herein by reference. For additional information regarding fabrication and utilization of photoluminescent materials to achieve various light emissions, refer to U.S. Pat. Nos. 8,207,511; 8,247,761; 8,519,359; 8,664,624; 9,057,021; and U.S. Patent Application Publication Nos. 2012/0183677 and 2014/0103258 all of which are incorporated herein by reference in their entirety.

According to one embodiment, the photoluminescent material 318 may include organic or inorganic fluorescent dyes including rylenes, xanthenes, porphyrins, phthalocyanines. Additionally, or alternatively, the photoluminescent material 318 may include phosphors from the group of Ce-doped garnets such as YAG:Ce and may be a short persistence photoluminescent material 318. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 324 and the moment when the light intensity of the converted light 326 emitted from the photoluminescent structure 310 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 318 with ultra-short persistence characteristics, which can emit the converted light 326 by absorbing purple to blue excitation light 324 emitted from a light source 324. According to one embodiment, a ZnS:Ag phosphor may be used to create a blue converted light 326. A ZnS:Cu phosphor may be utilized to create a yellowish-green converted light 326. A $Y_2O_2S$:Eu phosphor may be used to create red converted light 326. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201, the entire disclosure of which is incorporated herein by reference.

Additionally, or alternatively, the photoluminescent material 318, according to one embodiment, disposed within the photoluminescent structure 310 may include a long persistence photoluminescent material 318 that emits the converted light 326, once charged by the excitation light 324.

The excitation light 324 may be emitted from any excitation source (e.g., any natural light source, such as the sun, and/or any artificial light source). The long persistence photoluminescent material 318 may be defined as having a long decay time due to its ability to store the excitation light 324 and release the converted light 326 gradually, for a period of several minutes or hours, once the excitation light 324 is no longer present.

The long persistence photoluminescent material 318, according to one embodiment, may be operable to emit light at or above an intensity of 0.32 mcd/m² after a period of ten (10) minutes. Additionally, the long persistence photoluminescent material 318 may be operable to emit light above or at an intensity of 0.32 mcd/m² after a period of thirty (30) minutes and, in some embodiments, for a period substantially longer than sixty (60) minutes (e.g., the period may extend twenty-four (24) hours or longer, and in some instances, the period may extend forty-eight (48) hours). Accordingly, the long persistence photoluminescent material 318 may continually illuminate in response to excitation from any light sources that emit the excitation light 324, including, but not limited to, natural light sources (e.g., the sun) and/or any artificial light source. The periodic absorption of the excitation light 324 from any excitation source may provide for a substantially sustained charge of the long persistence photoluminescent material 318 to provide for consistent passive illumination. In some embodiments, a light sensor may monitor the illumination intensity of the photoluminescent structure 310 and actuate an excitation source when the illumination intensity falls below 0.32 mcd/m², or any other predefined intensity level.

The long persistence photoluminescent material 318 may correspond to alkaline earth aluminates and silicates, for example doped di-silicates, or any other compound that is capable of emitting light for a period of time once the excitation light 324 is no longer present. The long persistence photoluminescent material 318 may be doped with one or more ions, which may correspond to rare earth elements, for example, $Eu^{2-}$, $Tb^{3+}$ and/or $Dy^3$. According to one non-limiting exemplary embodiment, the photoluminescent structure 310 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 310, according to one embodiment, may be a translucent white color, and in some instances reflective, when unilluminated. Once the photoluminescent structure 310 receives the excitation light 324 of a particular wavelength, the photoluminescent structure 310 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 324 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 310. It will be understood that the compositions provided herein are non-limiting examples. Thus, any phosphor known in the art may be utilized within the photoluminescent structure 310 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. Nos. 6,953,536; 6,117,362; and 8,952,341, all of which are incorporated herein by reference in their entirety.

Figure 14:
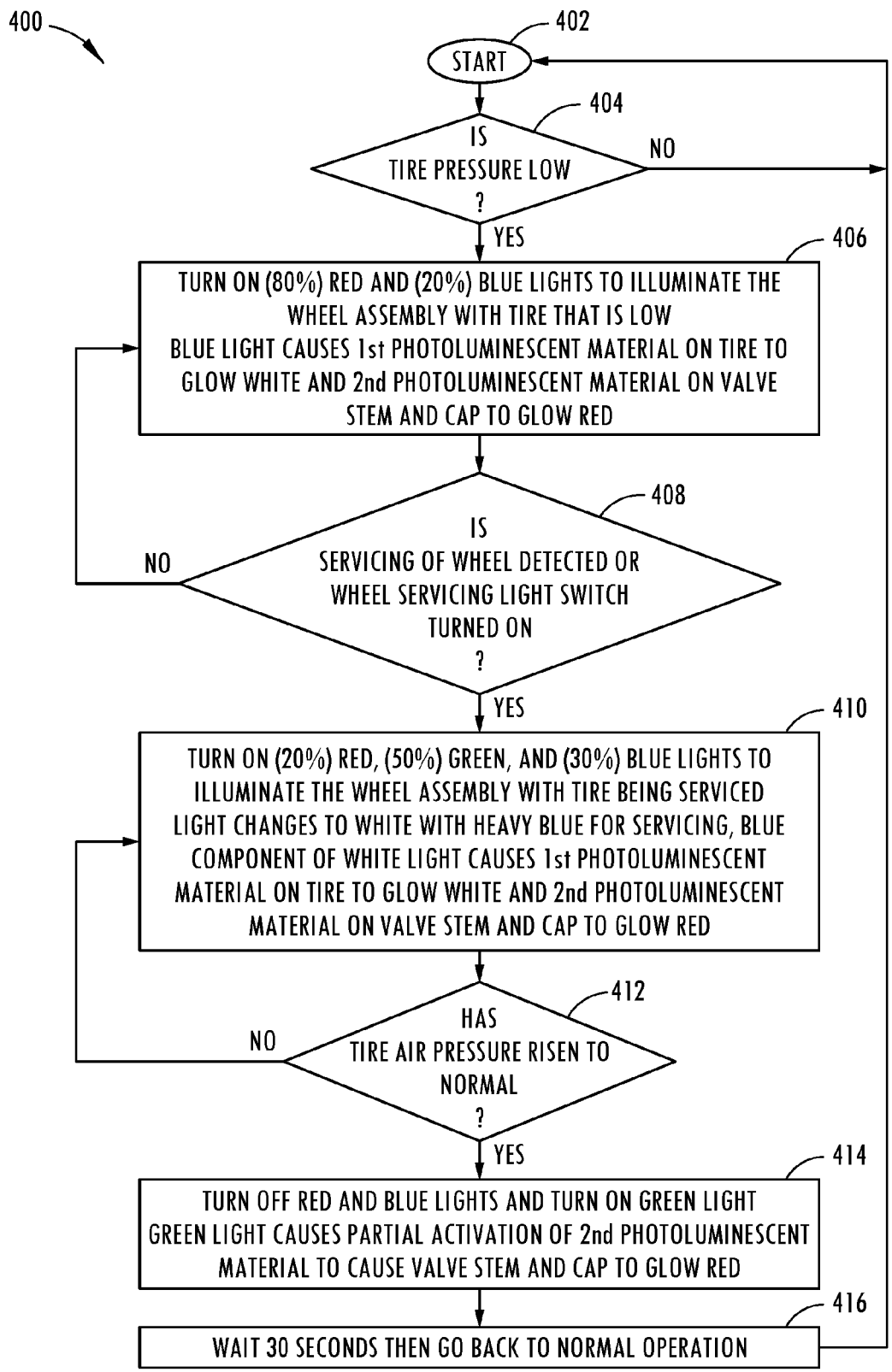
FIG. 14 is a flow diagram illustrating a routine for providing lighting control to illuminate the wheel assembly with a photoluminescent structure as shown in FIGS. 13A-13D, according to a first embodiment.

Referring to FIG. 14, the control routine 400 for controlling the light source of the wheel illumination assembly 20 to cause the photoluminescent material to luminescence is illustrated, according to one embodiment. The control routine 400 may be stored in memory and executed by microprocessor 52 of controller 50 shown in FIG. 10. Returning to FIG. 14, routine 400 begins at step 402 and proceeds to decision step 404 to determine if a low tire pressure is detected and, if not, returns to step 402. If a low tire pressure is detected, routine 400 proceeds to step 406 to turn on both red and blue lights (e.g., LEDs) of the light source to illuminate the wheel assembly including the tire that has a low tire pressure. The blue light causes the first photoluminescent structure on the tire side wall to glow a white color and causes the second photoluminescent structure on the valve stem and valve cap to glow a red color.

Next, at decision step 408, routine 400 determines if servicing of the wheel is detected or if a wheel servicing light switch has been turned on and, if not, returns to step 406. If the wheel is being serviced such as by detection of a person near the wheel or if the wheel servicing light switch has been turned on, routine 400 proceeds to step 410 to turn on the red, green and blue lights (e.g., LEDs) to illuminate the wheel assembly with the tire being serviced. The proportions of light emitted by the light source may include 20% red, 50% green and 30% blue, according to one embodiment. Due to the combination of red, green and blue colors, the overall area light changes to a substantially white light with heavy blue light for servicing. The blue component of the light causes the first photoluminescent material on the tire side wall to glow white and the second photoluminescent material on the valve stem and cap to glow red.

Next, at decision step 412, routine 400 determines if the air pressure in the tire has risen to a normal tire pressure and, if not, returns to step 410. If the tire pressure has risen to a normal tire pressure, routine 400 proceeds to step 414 to turn off the red and blue lights and to turn on the green light indicative of a fully serviced tire. The green light illuminates the wheel assembly and nearby area and causes partial activation of the second photoluminescent material to cause the valve stem and cap to illuminate red. Thereafter, routine 400 proceeds to step 416 to wait thirty (30) seconds before returning to the normal operation of the vehicle and to returning to step 402.

Figure 15A:
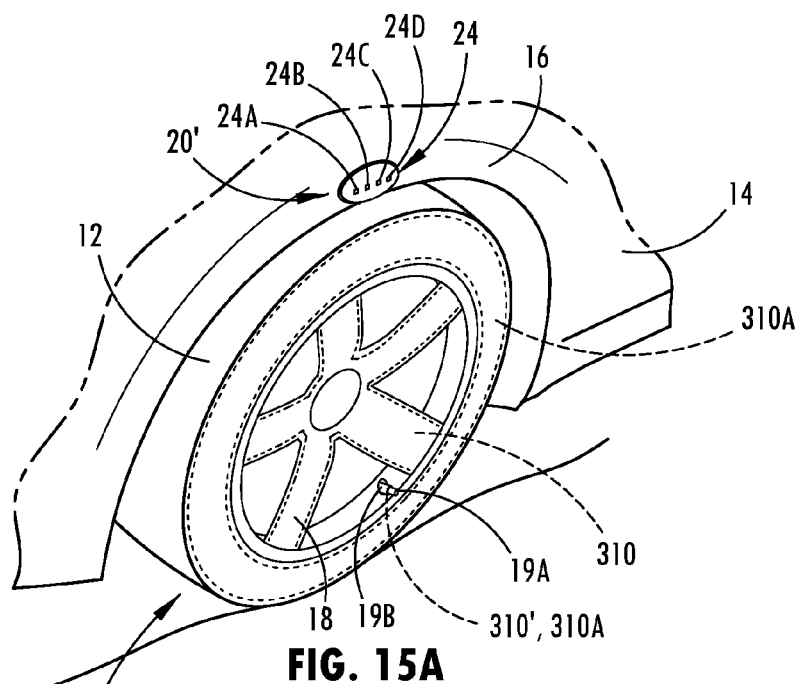
FIG. 15A is a perspective view of a portion of the vehicle body illustrating the wheel assembly having a photoluminescent structure in the form of phosphor, according to another embodiment.

Referring to FIGS. 15A-15D, the vehicle wheel illumination assembly 20' is illustrated further employing a photoluminescent material in the form of a phosphorescent material or structure 310A on the wheel assembly 15, which includes a phosphor, according to another embodiment. In this embodiment, the vehicle wheel illumination assembly 20' employs the light source 24 located on the wheel well 16 of the vehicle body 14 and arranged to illuminate a wheel assembly 15 of the vehicle, with the light source 24 further including a fourth LED 24D in the form of an ultraviolet (UV) LED for generating an ultraviolet illumination. The wheel assembly 15 is configured to include a phosphor-type photoluminescent structure 310A that is configured to luminesce in response to excitation by the ultraviolet illumination. The controller 50 (FIG. 10) may control the light source 24 to illuminate the wheel assembly 15 with the ultraviolet light (~10 to 400 nanometers in wavelength) from the UV LED 24D and to generate illumination from one or more of the other LEDs 24A-24C to cause the photoluminescent materials 310, 310' and 310A to luminescence in response to excitation by the light source 24 to enhance lighting of the wheel assembly 15 and the nearby surrounding area. As seen in FIG. 15A, the photoluminescent structure 310A containing photoluminescent material including phosphor is located on a side wall of the tire 12, according to one embodiment. The photoluminescent structure 310A may be coated or adhered to the side wall of a tire 12 or laminated or otherwise applied on or in the tire 12. The photoluminescent structure 310A may be formed in a ring-shaped pattern or may be applied in any other pattern on the tire 12 such as the outward protruding letters on the side wall of the tire 12. In addition, a photoluminescent structure 310 in the form of a rylene dye is shown located on the wheel 18, such as the spokes of the wheel 18. It should be appreciated that the photoluminescent structure 310 may also be located on the hub, the rim or other portions of the wheel 18. Further, photoluminescent material 310A containing phosphor and a second photoluminescent material 310' containing rylene dye are both located on the valve stem 19B and cap 19A. As such, the valve stem 19B and cap 19A may illuminate red color in response to excitation by blue light and may glow red in response to excitation by the UV light. The photoluminescent structures 310A, 310 and 310' are located on the wheel assembly 15 in a position such that the light source 24 may illuminate the photoluminescent structures 310, 310' and 310A and thereby activate the photoluminescent structures to provide a luminescence effect for illuminating the wheel assembly 15.

Figure 15B:
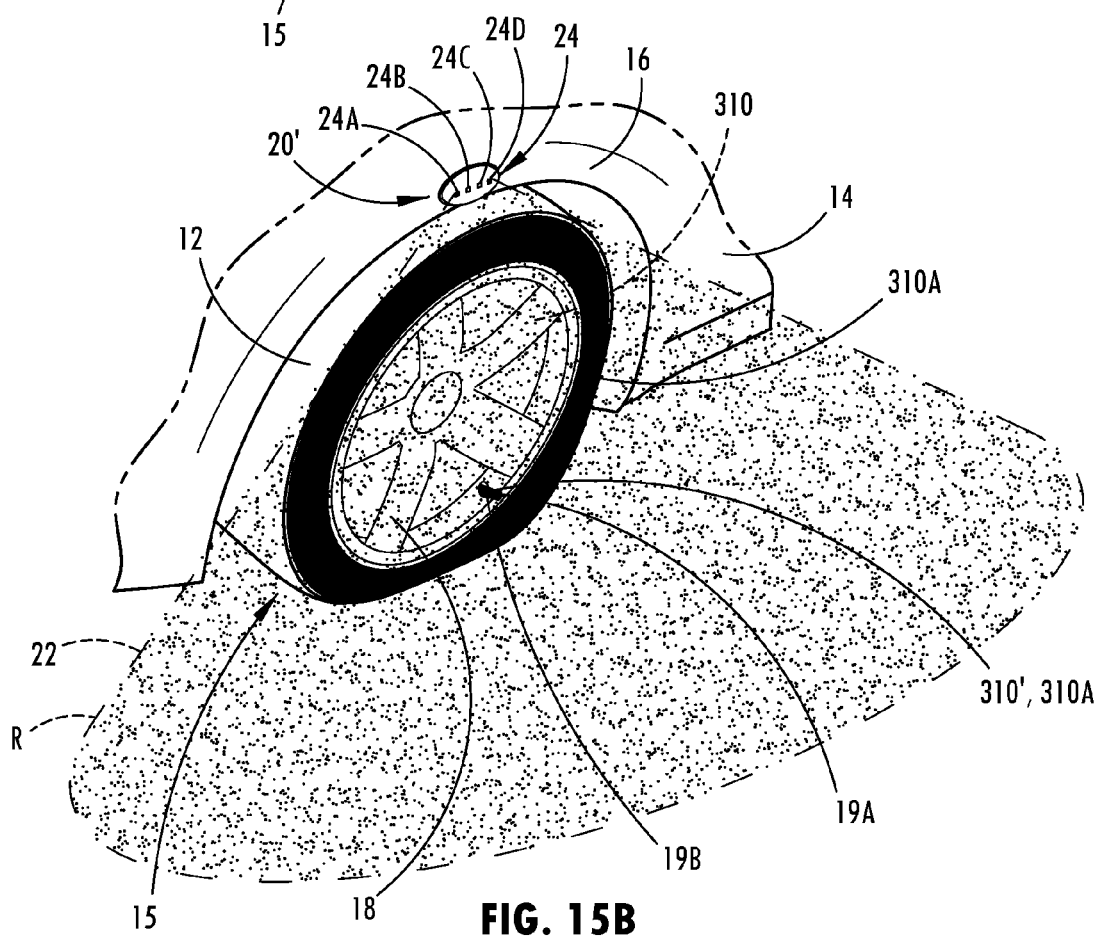
FIG. 15B is a perspective view of the portion of the vehicle body shown in FIG. 15A further illustrating illumination of the tire and valve stem and cap with photoluminescent material and with a first red color.

In FIG. 15B, the wheel assembly 15 is shown having the light source 24 activating the photoluminescent structure 310A with UV light emitted by UV LED 24D to cause the phosphor to glow a first white color on the tire sidewall. The UV light also causes the photoluminescent material 310A on the valve stem 19B and cap 19A to glow red color. In addition, and a red light is output by the red LED of the light source 24 to illuminate the wheel assembly within lighted region R indicative that the tire 12 requires servicing, such as a flat tire. The wheel assembly 15 has the photoluminescent structure 310 and photoluminescent structure 310' having a second photoluminescent material located on the tire valve stem 19B and cap 19A. It should be appreciated that the use of a phosphor-type photoluminescent structure 310A allows the tire 18 and the valve stem 19A and cap 19B to glow with light illumination both during and after being exciting by UV light. The afterglow on the tire 12 and the valve stem 19B and cap 19A may exist for a substantially long period of time to enable a person to service the tire.

Figure 15C:
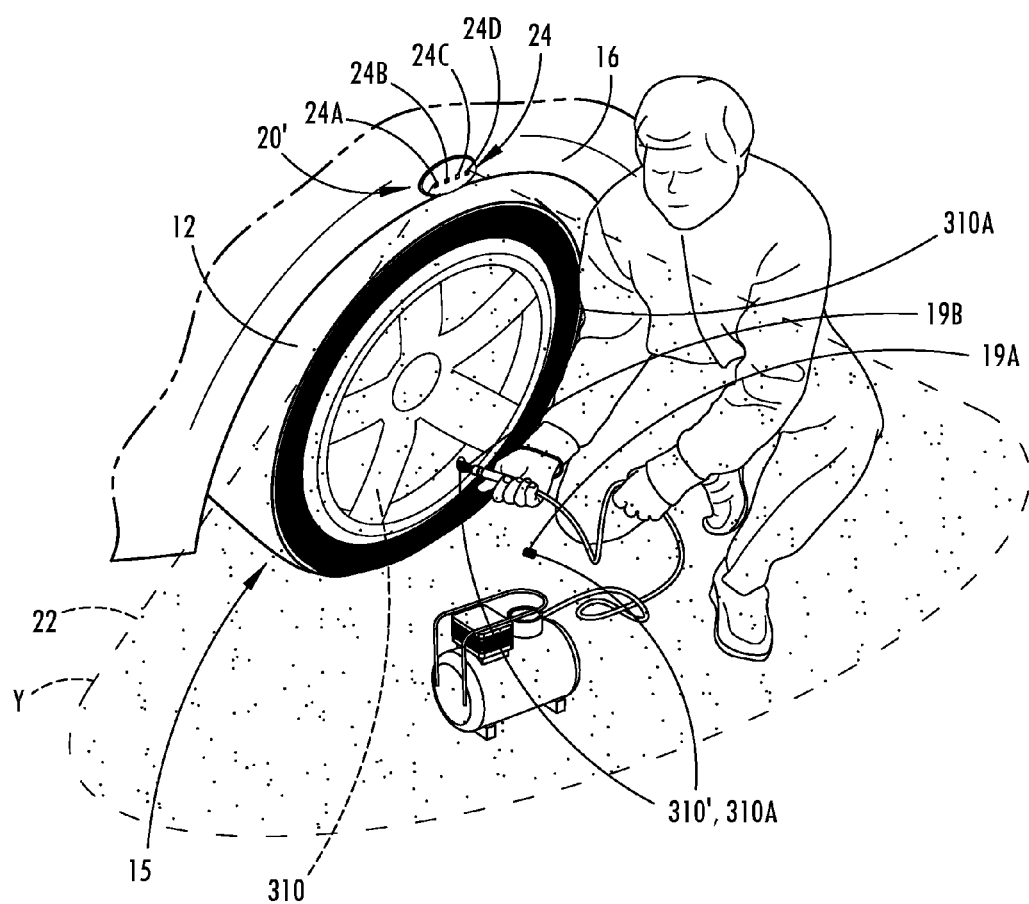
FIG. 15C is a perspective view of the portion of the vehicle body shown in FIG. 15A further illustrating the tire and valve stem and cap illuminated and with a second white color to enable servicing of a tire.

When the tire 12 requires servicing, the tire 12 may be illuminated with the UV light output by UV LED 24D and red and green lights output by other LEDs of light source 24 as shown in FIG. 15C. The light source 24 may generate a yellow light within lighted region Y by combining the red and green light colors. The yellow light enables a person to service a tire 12 as shown. The tire valve cap 19A is shown illuminated on the ground and therefore may be easily located during the servicing of the tire 12 and may glow for a significant period of time due to the inclusion of phosphor in photoluminescent structure 310A.

Figure 15D:
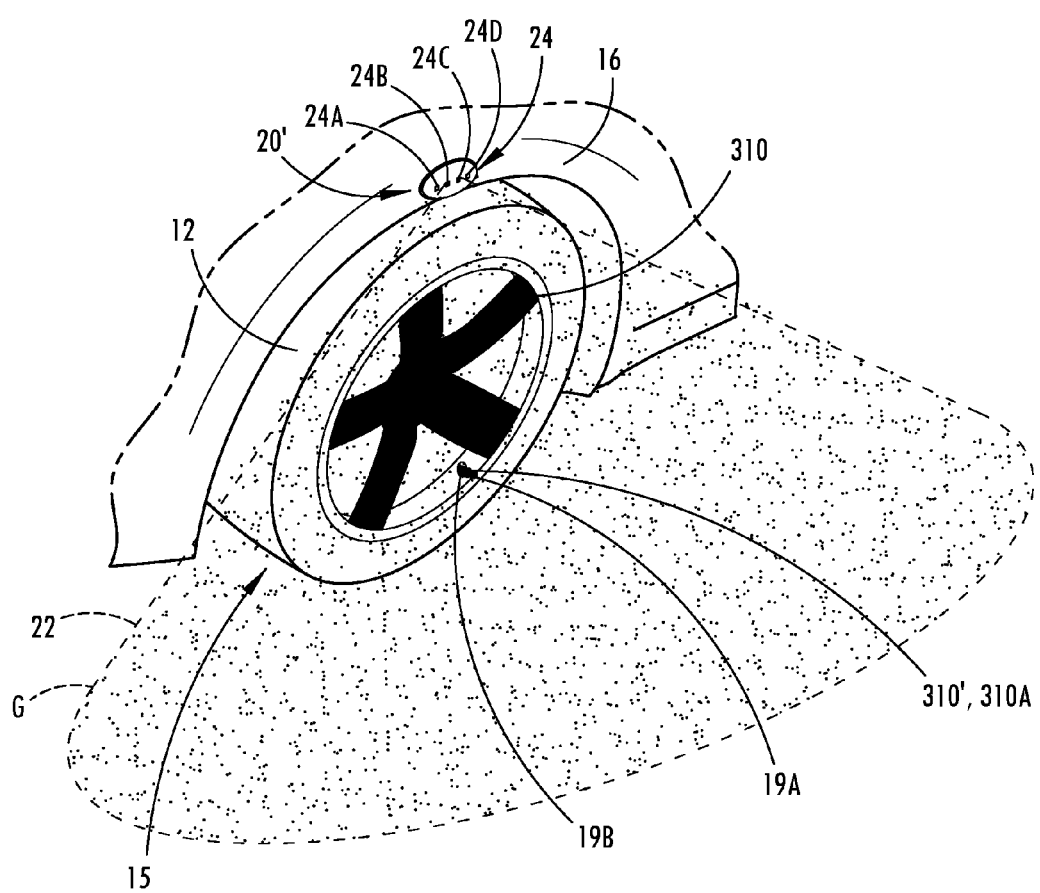
FIG. 15D is a perspective view of the portion of the vehicle body shown in FIG. 15A further illustrating illumination of the wheel assembly with a third green color.

Once the wheel assembly 15 is fully serviced and the tire inflation is at the proper level, the light source 24 may illuminate the wheel assembly 15 with a third light, such as a green light indicative of a fully serviced tire, as shown in FIG. 15D. At the same time, the blue light may be partially on to activate the photoluminescent structure 310' on the valve stem 19B and cap 19A to produce a green color which is a mixture of red from the phosphor and green from the rylene dye.

The phosphor-type photoluminescent structure 310A may include phosphor that glows for a significant amount of time after the light source 24 is turned off. The phosphor may include a long persistence photoluminescent material as described herein.

Figure 16:
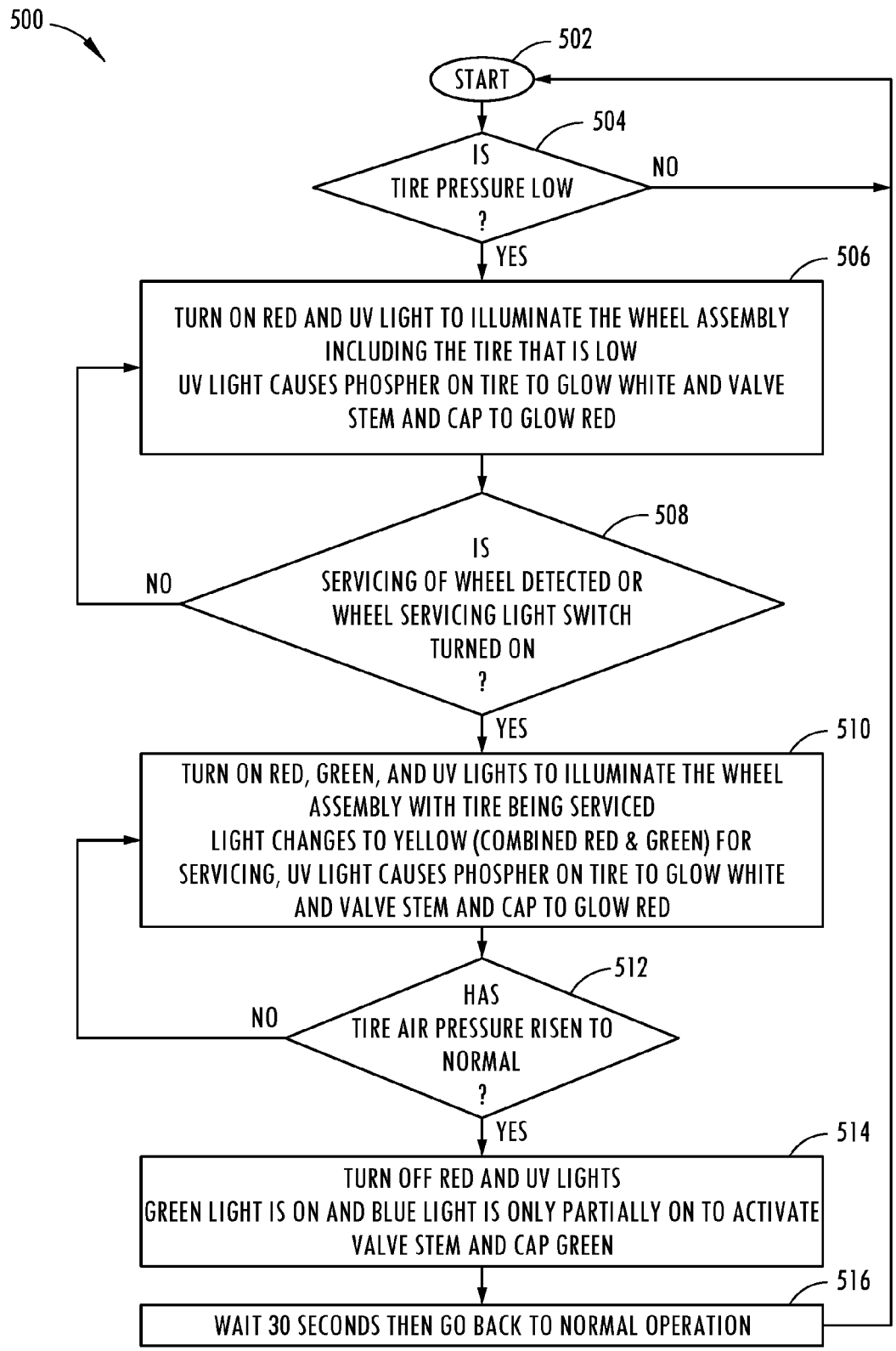
FIG. 16 is a flow diagram illustrating a routine for providing lighting control to illuminate the wheel assembly with a photoluminescent structure shown in FIGS. 15A-15D, according to a second embodiment.

Referring to FIG. 16, a control routine 500 for controlling the light source of the wheel illumination assembly to cause a phosphor-type photoluminescent structure 310A and photoluminescent structures 310 and 310' to luminescent as shown in FIGS. 15A-15D is illustrated, according to one embodiment. The control routine 500 may be executed by controller 50 (FIG. 10). The control routine 500 begins at step 502 and proceeds to decision step 504 to determine if the tire pressure is low and, if not, returns to step 502. If the tire pressure is determined to be low, routine 500 proceeds to step 506 to turn on both the red LED and UV LED to illuminate red and UV light on the wheel assembly including the tire that has a low pressure. The UV light causes phosphor-type photoluminescent structure 310A on the side wall of the tire to glow a white color light and photoluminescent structure 310A on the valve step and cap is activated to glow red color light. The red light produced by the red LED provides a red area light.

Next, at decision step 508, routine 500 determines if servicing of the wheel is detected or if the wheel servicing light switch has been turned on and, if not, returns to step 506. If servicing of the wheel is detected or the wheel servicing light switch is turned on, routine 500 proceeds to step 510 to turn on the red, green and UV lights to illuminate the wheel assembly with the tire being serviced. The light output thereby changes to yellow which is a combination of the red and green lights to enable servicing of the tire, and the UV light causes the phosphor-type photoluminescent structure 310A on the side wall of the tire to glow white color light and the phosphorescent structure 310' on the valve stem and cap to glow red color light.

Next, at decision step 512, routine 500 determines if the tire air pressure has risen to a normal tire pressure level and, if not, returns to step 510. If the tire pressure level has risen to a normal level, routine 500 proceeds to step 514 to turn off the red and UV lights. The green light may be on and the blue light may be partially on to activate the photoluminescent material 310' on the valve stem and cap. Thereafter, routine 500 proceeds to step 516 to wait thirty (30) seconds and go back to normal operation of the vehicle and returns to step 502.

While the vehicle wheel illumination assembly 20 is shown and described herein having a photoluminescent materials 310, 310' and 310A disposed on the wheel assembly, such as the side wall of the tire 12 and the spokes of a wheel 18, it should be appreciated that the photoluminescent materials may be disposed at other locations of the wheel assembly. In addition, it should be appreciated that other combinations of photoluminescent materials such as rylene dyes and phosphor may be used in various combinations and in different locations on the wheel assembly 15, according to various other embodiments.

Accordingly, the vehicle wheel illumination assembly 20 advantageously provides for enhanced illumination of a wheel assembly 15 of a vehicle with the use of a photoluminescent structure. The photoluminescent structure advantageously provides enhanced lighting which may be particularly useful for lighting an opaque color tire which may otherwise be difficult to see.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle wheel illumination assembly comprising:
a light source located on a vehicle body and arranged to illuminate a wheel assembly having a tire;
a first photoluminescent material located on one of the tire and a wheel of the wheel assembly and configured to luminesce a first color in response to excitation by the light source indicative of tire pressure; and
a second photoluminescent material located on at least one of a valve stem and a valve stem cap of the wheel assembly on the wheel assembly and configured to luminescence a second color different from the first color in response to excitation by the light source.

2. The assembly of claim 1 further comprising a controller for controlling the light source to illuminate the wheel assembly.

3. The assembly of claim 1, wherein the first photoluminescent material is located on the tire.

4. The assembly of claim 1, wherein the first photoluminescent material is located on the wheel of the wheel assembly.

5. The assembly of claim 1, wherein the second photoluminescent material comprises a rylene dye.

6. The assembly of claim 1, wherein the first photoluminescent material comprises phosphor.

7. The assembly of claim 1 further comprising a tire pressure detector for detecting the tire air pressure, wherein the light source illuminates the wheel assembly to indicate the tire pressure status indicative of the detected tire air pressure.

8. The assembly of claim 7, wherein the controller controls the light source to illuminate the wheel assembly with one color light to indicate low tire air pressure when the tire air pressure is below a pressure limit and to illuminate the wheel assembly with a different other color light to enable servicing of the tire.

9. The assembly of claim 1, wherein the light source is located on the vehicle body near a wheel well.

10. A vehicle wheel illumination assembly comprising:
a light source located on a body of a vehicle;
a tire pressure detector for detecting air inflation pressure of a tire on a wheel assembly of the vehicle;
first and second photoluminescent materials located on the wheel assembly configured to luminesce different colors in response to excitation by the light source, wherein the first photoluminescent material is located on one of the tire and a wheel and the second, photoluminescent material is located on at least one of a valve stem and a valve stem cap; and
a controller controlling the light source to illuminate the wheel assembly with a first color light indicative of a tire air pressure status.

11. The assembly of claim 10, wherein the controller further illuminates the wheel assembly with a second color light to enable servicing of the tire.

12. The assembly of claim 10, wherein the first photoluminescent material is located on an outer wall of the tire.

13. The assembly of claim 10, wherein the second photoluminescent material comprises a rylene dye.

14. The assembly of claim 10, wherein the first photoluminescent material comprises phosphor.

15. The assembly of claim 10, wherein the light source is located on the vehicle body at or near a wheel well of the vehicle.

16. A method of illuminating a vehicle wheel assembly comprising:
arranging a light source on a vehicle body to illuminate a wheel assembly comprising a tire;
providing first and second photoluminescent materials on the wheel assembly, wherein the first photoluminescent material is located on one of the tire and a wheel and the second photoluminescent material is located on at least one of a valve stem and a valve stem cap; and
activating the light source to illuminate light on the wheel assembly and excite the first and second photoluminescent materials to luminesce different colors, wherein the first photoluminescent material luminesces a first color indicative of tire pressure.

17. The method of claim 16 further comprising the steps of detecting a low tire pressure of the tire and activating the light source to indicate low tire pressure with one color light.

18. The assembly of claim 16, wherein the second photoluminescent material comprises a rylene dye.

19. The assembly of claim 16, wherein the first photoluminescent material comprises phosphor.

* * * * *